United States Patent
Kubota

(10) Patent No.: US 11,568,264 B2
(45) Date of Patent: Jan. 31, 2023

(54) USING SHAPE INFORMATION AND LOSS FUNCTIONS FOR PREDICTIVE MODELLING

(71) Applicant: Nozomu Kubota, Tokyo (JP)

(72) Inventor: Nozomu Kubota, Tokyo (JP)

( * ) Notice: Subject to any disclaimer, the term of this patent is extended or adjusted under 35 U.S.C. 154(b) by 0 days.

(21) Appl. No.: 17/608,978

(22) PCT Filed: Sep. 25, 2020

(86) PCT No.: PCT/JP2020/036328
§ 371 (c)(1),
(2) Date: Nov. 4, 2021

(87) PCT Pub. No.: WO2021/157124
PCT Pub. Date: Aug. 12, 2021

(65) Prior Publication Data
US 2022/0147829 A1 May 12, 2022

(30) Foreign Application Priority Data

Feb. 3, 2020 (JP) .............................. JP2020-016010

(51) Int. Cl.
*G06N 3/08* (2006.01)
*G06N 10/20* (2022.01)
(Continued)

(52) U.S. Cl.
CPC .............. *G06N 3/084* (2013.01); *G06F 17/18* (2013.01); *G06N 10/20* (2022.01); *G06N 10/60* (2022.01); *G06N 20/00* (2019.01)

(58) Field of Classification Search
CPC ........ G06N 3/084; G06N 10/20; G06N 10/60; G06N 20/00; G06N 3/006; G06N 5/003; G06N 7/005; G06F 17/18
See application file for complete search history.

(56) References Cited

U.S. PATENT DOCUMENTS 11,120,361 B1 * 9/2021 Januschowski ........ G06N 3/084
11,232,369 B1 * 1/2022 Li .......................... G06N 20/00
(Continued)

FOREIGN PATENT DOCUMENTS

JP 2018066136 A 4/2018
JP 2019220063 A 12/2019

OTHER PUBLICATIONS

Thornton et al., "Auto-WEKA: Combined Selection and Hyperparameter Optimization of Classification Algorithms", 2013, KDD 2013, pp. 847-855 (Year: 2013).*

(Continued)

*Primary Examiner* — Brent Johnston Hoover
(74) *Attorney, Agent, or Firm* — Procopio, Cory, Hargreaves & Savitch LLP

(57) ABSTRACT

Provided are an analysis device, an analysis method, and an analysis program which predict the performance of a learning model when learning processing is executed using multiple algorithms. Using a predictive model produced by supervised learning using first shape information representing a global shape of a first loss function set for a prescribed problem and the performance of the learning model as learning data, an analysis device 10 predicts, for each of the multiple algorithms, the performance of a learning model when machine learning by the learning model is executed so that a second loss function has a reduced value on the basis of second shape information representing a global shape of the second loss function set for a new problem.

13 Claims, 16 Drawing Sheets

(51) Int. Cl.
   *G06N 10/60*  (2022.01)
   *G06F 17/18*  (2006.01)
   *G06N 20/00*  (2019.01)

(56) References Cited

U.S. PATENT DOCUMENTS

2020/0342345 A1* 10/2020 Farhi ............... G06N 10/00
2020/0410325 A1* 12/2020 Tanaka ............ G06K 9/6273
2021/0089832 A1*  3/2021 Gonzalez ......... G06F 17/11

OTHER PUBLICATIONS

Kujirahikodzukue et al., "How to make AI machine learning deep learning apps using Python", Socym Co,.Ltd., Feb. 20, 2019, pp. 112-114.
Adaptive Bulk Search Solving Quadratic Unconstrained Binary Optimization Problems on Multiple GPUs, [online], [retrieved Aug. 25, 2020].
Chen et al., "AMENet Attentive Maps Encoder Network for Trajectory Prediction", Hao Chenga, Wentong Liaob, Michael Ying Yangc, Bodo Rosenhahnb, Monika Sester (2021).
D. Helbing, P. Molnar, "Social force model for pedestrian dynamics", Physical review E 51 (5) (1995) 4282.
F. Giuliari, I. Hasan, M. Cristani, F. Galasso, "Transformer networks for trajectory forecasting", arXiv preprint arXiv2003.08111 (2020).
M. Feurer, A. Klein, K. Eggensperger, J. Springenberg , M. Blum and F. Hutter, "Efficient and Robust Automated Machine Learning", NIPS, 2015.
Neven et al., "QBoost: Large Scale Classifier Training with Adiabatic Quantum Optimization" JMLR: Workshop and Conference Proceedings 25:333-348, 2012.
Biamonte et al., "Quantum Machine Learning" Nature vol. 549, pp. 195-202 (2017).
A. Alahi, K. Goel, V. Ramanathan, A. Robicquet, L. Fei-Fei, S. Savarese, Social lstm: Human trajectory prediction in crowded spaces, in: In Proceedings of CVPR, 2016, pp. 961-971.
Gupta et al., "Social GAN: Socially Acceptable Trajectories with Generative Adversarial Networks" in: In Proceedings of CVPR, 2018, pp. 2255-2264.
Hasan et al., "MX-LSTM: mixing tracklets and vislets to jointly forecast trajectories and head poses" in: In Proceedings of CVPR, 2018, pp. 6067-6076.
Zhang et al., "SR-LSTM: State Refinement for LSTM towards Pedestrian Trajectory Prediction" in: In Proceedings of CVPR, 2019, pp. 12085-12094.
Becker et al., "An Evaluation of Trajectory Prediction Approaches and Notes on the TrajNet Benchmark" arXiv preprint arXiv:1805.07663 (2018).
Charan et al., "Vision-Aided Dynamic Blockage Prediction for 6G Wireless Communication Networks" arXiv preprint arXiv:2006.09902 (2020).
Uchimi et al., "Object Perception in the Blind Spots with Mirror Based on Depth Prediction Using CNN" The 33rd Annual Conference of the Japanese Society for Arlilicial Intelligence, 2019, pp. 1-4.
Thornton et al., "Auto-WEKA: Combined Selection and Hyperparameter Optimization of Classification Algorithms" arXiv preprint arXiv:1208.3719 (2013).
Komer et al., "Hyperopt-Skleam: Automatic Hyperparameter Configuration for Scikit-Learn" Proc. of the 13th Python in Science Conf. (SCIPY 2014) pp. 34-40.
Olson et al., "Evaluation of a Tree-based Pipeline Optimization Tool for Automating Data Science" arXiv preprint arXiv:1603.06212. (2016).

* cited by examiner

Fig. 3

| | Random Search | Bayesian Optimization | CMA-ES | Coordinate Search | Nelder-Mead |
|---|---|---|---|---|---|
| SGD | a1 | a2 | a3 | a4 | a5 |
| Momentum SGD | b1 | b2 | b3 | b4 | b5 |
| AdaGrad | c1 | c2 | c3 | c4 | c5 |
| RMSProp | d1 | d2 | d3 | d4 | d5 |
| AdaDelta | e1 | e2 | e3 | e4 | e5 |
| ADAM | f1 | f2 | f3 | f4 | f5 |
| QUANTUM GATE | g1 | g2 | g3 | g4 | g5 |
| QUANTUM ANNEALING | h1 | h2 | h3 | h4 | h5 |

Fig. 5

|  | FIRST SHAPE INFORMATION | PERFORMANCE OF LEARNING MODEL |
|---|---|---|
| SGD | $La(\theta)$ | Sa |
| Momentum SGD | $Lb(\theta)$ | Sb |
| AdaGrad | $Lc(\theta)$ | Sc |
| RMSProp | $Ld(\theta)$ | Sd |
| AdaDelta | $Le(\theta)$ | Se |
| ADAM | $Lf(\theta)$ | Sf |
| QUANTUM GATE | $Lg(\theta)$ | Sg |
| QUANTUM ANNEALING | $Lh(\theta)$ | Sh |

Fig. 8

|  | Random Search | Bayesian Optimization | CMA-ES | Coordinate Search | Nelder-Mead |
|---|---|---|---|---|---|
| HIERARCHICAL CLUSTERING | G1 | G2 | G3 | G4 | G5 |
| NON-HIERARCHICAL CLUSTERING | G6 | G7 | G8 | G9 | G10 |
| TOPIC MODEL | G11 | G12 | G13 | G14 | G15 |
| SELF-ORGANIZING MAP | G16 | G17 | G18 | G19 | G20 |
| ASSOCIATION ANALYSIS | G21 | G22 | G23 | G24 | G25 |
| COOPERATIVE FILTERING | G26 | G27 | G28 | G29 | G30 |
| CANONICAL CORRELATION ANALYSIS | G31 | G32 | G33 | G34 | G35 |
| QUANTUM ANNEALING | G36 | G37 | G38 | G39 | G40 |
| QUANTUM GATE | G41 | G42 | G43 | G44 | G45 |

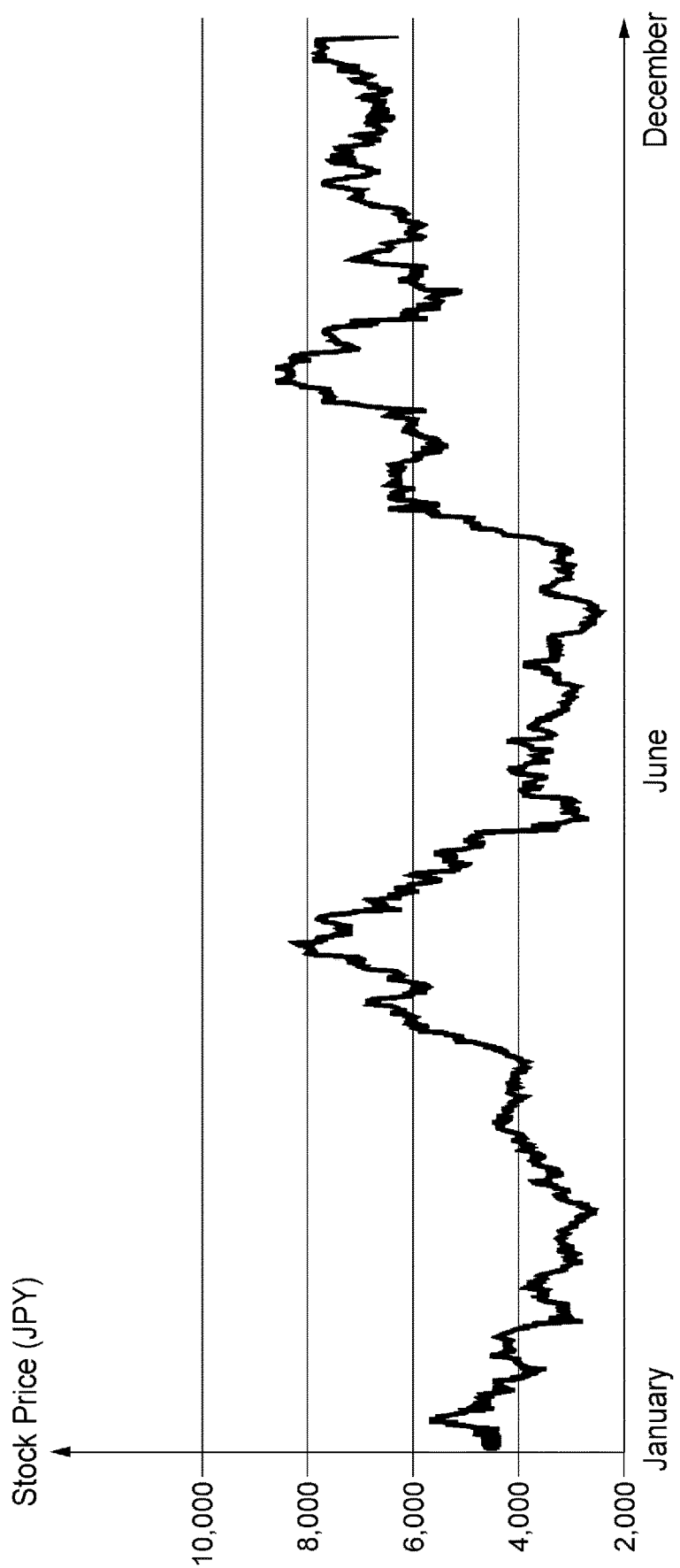

Fig. 13

| | Random Search | Bayesian optimization | CMA-ES | Coordinate-search method | Nelder-Mead |
|---|---|---|---|---|---|
| Turtle Trading agent | G1 | G2 | G3 | G4 | G5 |
| Moving Average agent | G6 | G7 | G8 | G9 | G10 |
| Signal Rolling agent | G11 | G12 | G13 | G14 | G15 |
| Policy Gradient agent | G16 | G17 | G18 | G19 | G20 |
| Q-learning agent | G21 | G22 | G23 | G24 | G25 |
| Evolution Strategy agent | G26 | G27 | G28 | G29 | G30 |
| Double Q-learning agent | G31 | G32 | G33 | G34 | G35 |
| Recurrent Q-learning agent | G36 | G37 | G38 | G39 | G40 |
| Double Recurrent Q-learning agent | G41 | G42 | G43 | G44 | G45 |
| Duel Q-learning agent | G46 | G47 | G48 | G49 | G50 |
| Double Duel Q-learning agent | G51 | G52 | G53 | G54 | G55 |
| Duel Recurrent Q-learning agent | G56 | G57 | G58 | G59 | G60 |
| Double Duel Recurrent Q-learning agent | G61 | G62 | G63 | G64 | G65 |
| Actor-critic agent | G66 | G67 | G68 | G69 | G70 |
| Actor-critic Duel agent | G71 | G72 | G73 | G74 | G75 |
| Actor-critic Recurrent agent | G76 | G77 | G78 | G79 | G80 |
| Actor-critic Duel Recurrent agent | G81 | G82 | G83 | G84 | G85 |
| Curiosity Q-learning agent | G86 | G87 | G88 | G89 | G90 |
| Recurrent Curiosity Q-learning agent | G91 | G92 | G93 | G94 | G95 |
| Duel Curiosity Q-learning agent | G96 | G97 | G98 | G99 | G100 |
| Neuro-evolution agent | G101 | G102 | G103 | G104 | G105 |
| Neuro-evolution with Novelty search agent | G106 | G107 | G108 | G109 | G110 |
| ABCD strategy agent | G111 | G112 | G113 | G114 | G115 |
| Deep Evolution Strategy | G116 | G117 | G118 | G119 | G120 |

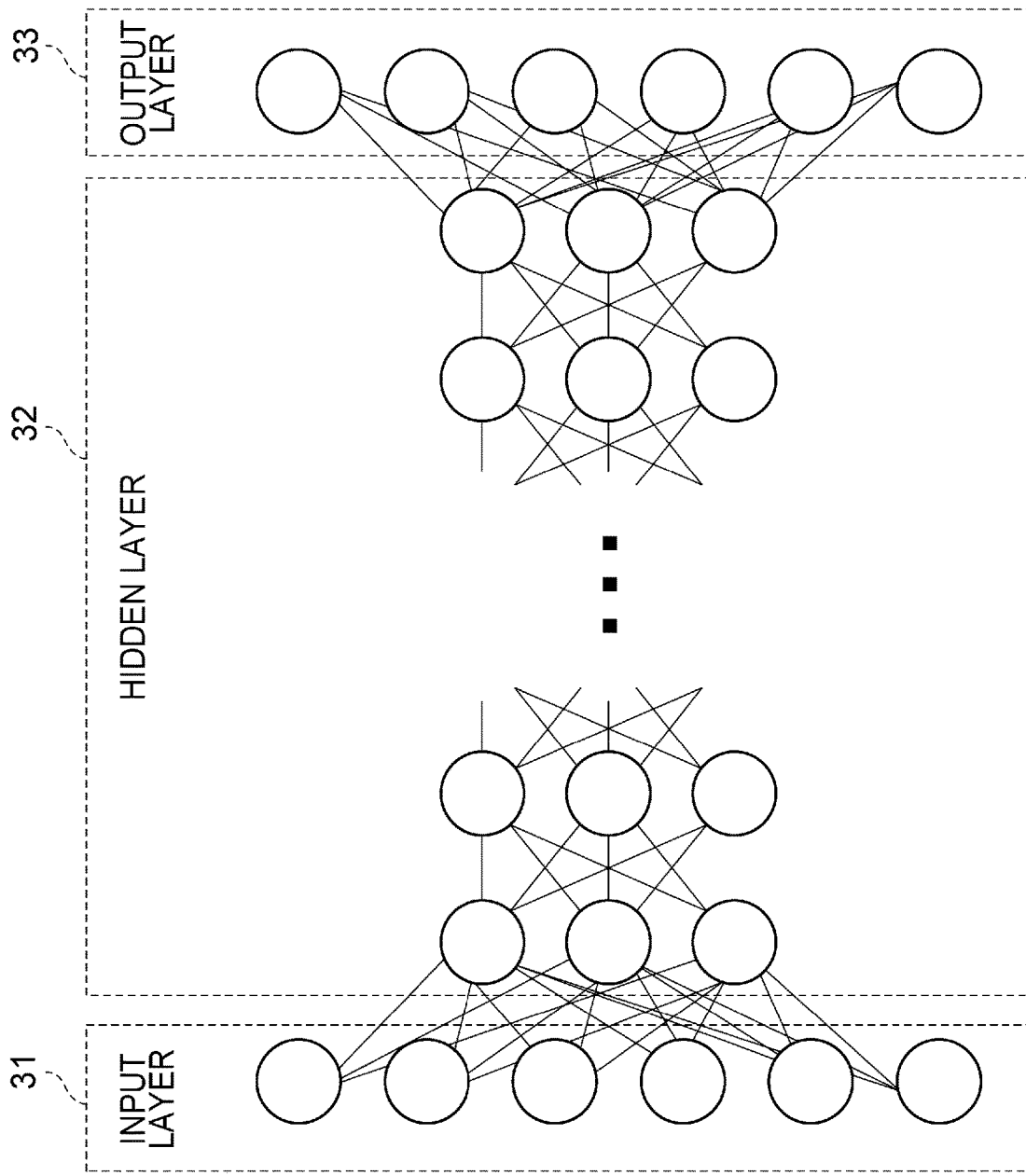

USING SHAPE INFORMATION AND LOSS FUNCTIONS FOR PREDICTIVE MODELLING

CROSS-REFERENCE TO RELATED APPLICATIONS

This application is a U.S. National Stage entry of PCT Application No: PCT/JP2020/036328 filed Sep. 25, 2020, which claims priority to Japanese Patent Application No. 2020-016010 filed Feb. 3, 2020, the contents of which are incorporated herein by reference.

TECHNICAL FIELD

The present invention relates to an analysis device, an analysis method, and an analysis program.

BACKGROUND ART

In recent years, there have been attempts to address various problems by applying so-called artificial intelligence. For example, Patent Document 1 discloses a model selecting device directed to a solution to problems encountered in various real events.

CITATION LIST

Patent Document

Patent Document 1: Patent Publication JP-A-2019-220063

SUMMARY

Technical Problem

There are a number of algorithms for learning processing for a learning model, but the performance of a learning model may not be fully brought out unless an appropriate algorithm for learning processing is selected according to a problem. In general, a prescribed algorithm is used to solve a prescribed problem according to knowledge empirically obtained by a person who sets the learning model, and there is no means to evaluate the performance of the selected algorithm in terms of whether the algorithm is appropriate.

It is therefore an object of the present invention to provide an analysis device, an analysis method, and an analysis program for predicting the performance of a learning model when learning processing is performed using multiple algorithms.

Solution to Problem

An analysis device according to one aspect of the invention includes a learning unit which performs machine learning by a prescribed model using multiple algorithms so that a first loss function set for a prescribed problem has a reduced value, a computing unit which computes, for each of the algorithms, first shape information representing a global shape of the first loss function and the performance of the learning model on the basis of the machine learning, an obtaining unit which obtains second shape information representing a global shape of a second loss function computed by the computing unit when the learning unit executes such machine learning using at least one of the multiple algorithms that the second loss function set for a new problem has a reduced value, and a predicting unit which predicts, for each of the multiple algorithms, the performance of the learning model when machine learning by the learning model is performed using a predictive model produced by supervised learning using the first shape information and the performance of the learning model as learning data so that the second loss function has a reduced value on the basis of the second shape information.

According to the aspect, when machine learning by a learning model is executed using at least one of multiple algorithms, the performance of the learning model obtained when machine learning by the learning model is executed using another algorithm can be predicted.

Advantageous Effects of Invention

According to the present invention, provided are an analysis device, an analysis method, and an analysis program for predicting the performance of a learning model when learning processing is performed using multiple algorithms.

BRIEF DESCRIPTION OF DRAWINGS

FIG. 3 is a table for illustrating the performance of a learning model which has gone through learning processing by the analysis device according to the embodiment.

FIG. 5 is a table for illustrating learning data computed by the analysis device according to the embodiment.

FIG. 8 is a table for illustrating the performance of a learning model which has gone through learning processing by the analysis device according to the embodiment.

FIG. 12 is a diagram showing stock price movement data about a prescribed stock used in machine learning by a learning model according to the embodiment.

FIG. 13 is a diagram for illustrating reinforcement learning algorithms and optimization algorithms used in machine learning by the analysis device according to the embodiment.

FIG. 14 is a diagram for illustrating an exemplary estimation model produced by an estimation model producing unit according to the embodiment.

DESCRIPTION OF EMBODIMENTS

Figure 1:
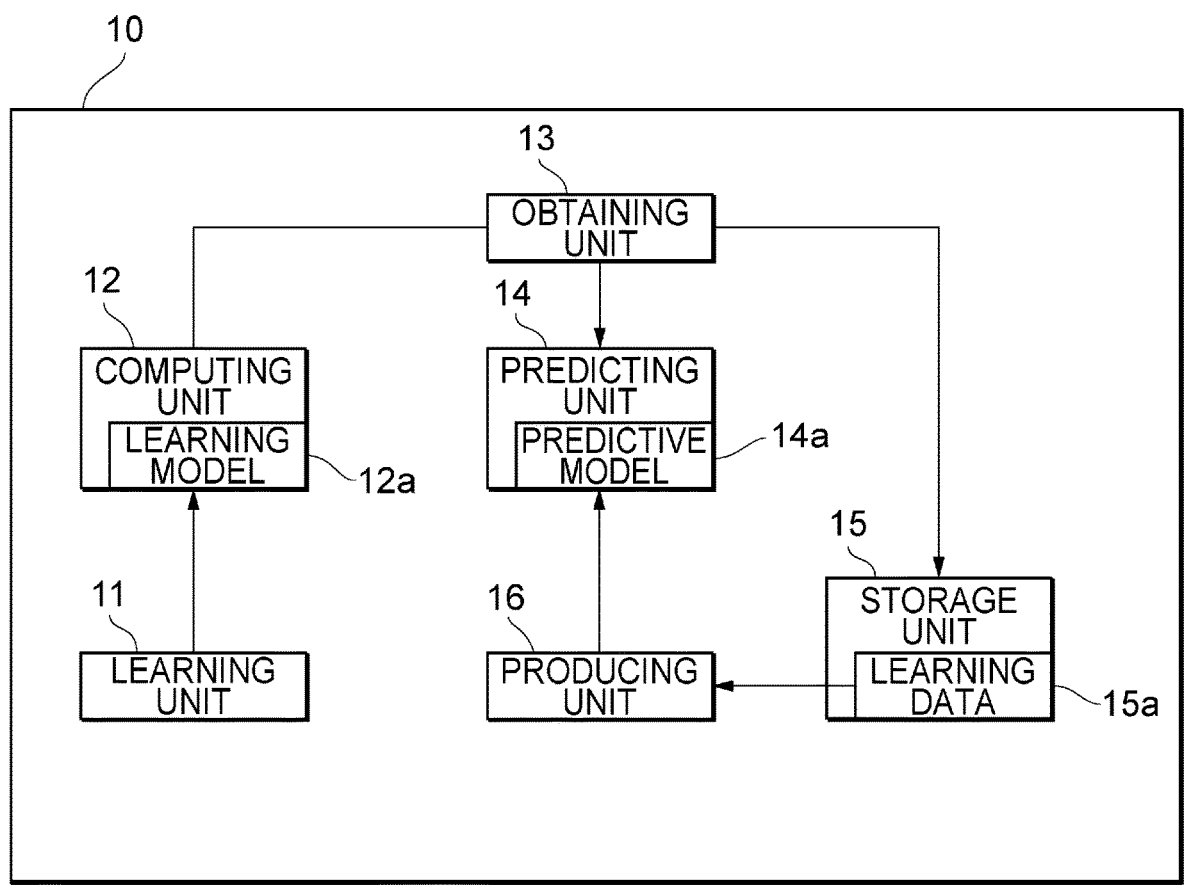
FIG. 1 is a functional block diagram of an analysis device according to a first embodiment of the present invention.

An embodiment of the present invention will be described in conjunction with the accompanying drawings. Note that the elements designated by the same reference characters in the drawings have identical or substantially identical features.

First Embodiment

FIG. 1 is a functional block diagram of an exemplary analysis device 10 according to a first embodiment of the present invention. The analysis device 10 includes a learning unit 11, a computing unit 12, an obtaining unit 13, a predicting unit 14, a storage unit 15, and a producing unit 16. The analysis device 10 may include a general-purpose computer.

The learning unit 11 performs machine learning for a prescribed learning model using multiple algorithms so that a first loss function set for a prescribed problem has a reduced value. Here, the prescribed problem includes, for example, the problem of classifying, producing, and optimizing at least one of image data, series data, and text data. Here, the image data includes still image data and moving image data. The series data includes audio data and stock price data. The prescribed learning model includes an image recognition model, a series data analysis model, a robot control model, a reinforced learning model, an audio recognition model, an audio producing model, an image producing model, and a natural language processing model, and the model may be one of CNN (Convolutional Neural Network), RNN (Recurrent Neural Network), LSTM (Long Short-Term Memory), bidirectional LSTM, DQN (Deep Q-Network), VAE (a Variational AutoEncoder), GANs (Generative Adversarial Networks), WaveNet, BERT (Bidirectional Encoder Representations from Transformers), Word2Vec, random forests, support vector machines, logistic regression, gradient boosting decision tree, principal component analysis and other models applicable to learning. The learning model also includes a model obtained by pruning, quantization, distillation, or transfer of an existing pre-trained model. Note that these are only examples, and the learning unit 11 may perform machine learning by the learning model for any other problem.

When the multiple algorithms are each used for machine learning for a learning model 12a and the learning model 12a includes a neural network, the algorithms may update and optimize the parameters of the neural network by error back propagation. The multiple algorithms include for example stochastic gradient descent (SGD), momentum SGD, AdaGrad, RMSProp, AdaDelta, and ADAM. The multiple algorithms also include algorithms which allow the parameters of the learning model 12a to be updated by a quantum gate or quantum annealing type quantum computer. When for example the learning model 12a is configured by one strong learner obtained as a combination of weak learners, the algorithm described in Hartmut Neven, Vasil S. Denchev, Geordie Rose, and William G. Macready, "QBoost: Large Scale Classifier Training with Adiabatic Quantum Optimization", Proceedings of the Asian Conference on Machine Learning, PMLR 25:333-348, 2012 may be used. The algorithms described in Jacob Biamonte, Peter Wittek, Nicola Pancotti, Patrick Rebentrost, Nathan Wiebe and Seth Lloyd, "Quantum Machine Learning, "Nature, volume 549, pages 195-202, 2017 may also be used. The multiple algorithms also include XGBoost, LightGBM, bugging (an algorithm which learns in parallel), boosting (an algorithm which reflects the results of previous weak learners in the next learning data) and stacking (an algorithm which accumulates learning in two stages). The algorithms also include the "adaptive bulk search" algorithms described in the following reference document 1.

(Reference document 1): Adaptive Bulk Search: Solving Quadratic Unconstrained Binary Optimization Problems on Multiple GPUs, [online], [retrieved Aug. 25, 2020]: <URL: https://www.hiroshima-u.ac.jp/new/59579>.

Note that these are only examples, and the multiple algorithms may include other algorithms. The quantum computer may include a superconducting line for quantum bits, an ion trap for quantum bits, quantum dots for quantum bits or an optical circuit for quantum bits, and the hardware configuration is optional. The multiple algorithms may include algorithms for updating the parameters of the learning model 12a by a hybrid computer between a quantum computer and a classical computer.

The computing unit 12 computes first shape information representing a global shape of the first loss function and the performance of the learning model 12a for each algorithm on the basis of machine learning. The first loss function set for a prescribed problem may be a square error function related to the output of the learning model 12a and labelled data or a cross entropy function. When multiple parameters included in the learning model 12a are represented by $\theta$, the first loss function can be expressed as the function $L(\theta)$ related to the multiple parameters 8. The value of the function $L(\theta)$ is herein referred to as the first shape information representing the global shape of the first loss function. For example, the computing unit 12 records the value of the function $L(\theta)$ with respect to the parameters 8 on the basis of machine learning by the learning model 12a and computes the first shape information $L(\theta)$ representing the global shape of the first loss function.

The performance of the learning model 12a may be represented, for example, by a value F, a value F/(computing time for learning processing), or the value of the first loss function. The value F is a value produced by 2PR/(P+R) where P represents precision and R represents recall. The performance of the learning model 12a may also be represented using ME (Mean Error), MAE (Mean Absolute Error), RMSE (Root Mean Square Error), MPE (Mean Percentage Error), MAPE (Mean Absolute Percentage Error), RMSPE (Root Mean Squared Percentage Error), an ROC (Receiver Operating Characteristic) curve and AUC (Area Under the Curve), Gini Norm, Kolmogorov-Smirnov or Precision/Recall. The computing unit 12 computes the performance of the learning model 12a represented for example by the value F on the basis of machine learning by the learning model 12a.

The learning unit 11 may set multiple initial values for the parameters of the learning model 12a and execute machine learning by a prescribed learning model 12a individually or in parallel using multiple algorithms so that the first loss function has a reduced value. In the case of parallel execution, the computing unit 12 computes the first shape information and the performance of the learning model 12a in parallel for each algorithm on the basis of the machine learning.

The multiple initial values are set for the parameters of the learning model 12a because the possibility that a parameter corresponding to the minimal value of the loss function will be selected can be reduced by performing machine learning by the learning model 12a using the multiple initial values. This increases the probability that a parameter corresponding to the minimum value of the globally optimal loss function can be selected. In addition, when the machine learning of the learning model 12a is executed in parallel for the multiple initial values, a global optimal solution can be obtained at high speed.

As the learning unit 11 executes such machine learning that a second loss function set for a new problem has a reduced value using at least one of the multiple algorithms, the obtaining unit 13 obtains second shape information representing a global shape of the second loss function computed by the computing unit 12. Here, the new problem includes the problem of classifying, producing, and optimizing at least one of image data, series data, and text data. The second loss function may also be a square error function related to the output of the learning model 12a and labelled data or a cross entropy function, and the second shape information may be in a function form $L(\theta)$ of the second loss function related to the multiple parameters e.

The predicting unit 14 uses a predictive model 14a produced by supervised learning using the first shape information and the performance of the learning model 12a as learning data. The predicting unit 14 predicts, for each of the multiple algorithms, the performance of the learning model 12a using the predictive model 14a when machine learning by the learning model 12a is executed so that the second loss function has a reduced value on the basis of the second shape information. For example, the predicting unit 14 inputs second shape information about a prescribed algorithm to the predictive model 14a and outputs the performance of the learning model 12a when machine learning is performed for each of the multiple algorithms including the other algorithms.

For a new problem, it may take time to select an algorithm in determining which algorithm may be used to appropriately bring out the performance of the learning model 12a by trial and error. The analysis device 10 according to the embodiment performs machine learning by the learning model 12a using at least one of the multiple algorithms, so that the performance of the learning model 12a which would be obtained when the machine learning by the learning model 12a is performed using another algorithm can be predicted. Therefore, when a new problem is given, which algorithm should be used can be quickly determined and the performance of the learning model 12a can be brought out appropriately.

The learning unit 11 may reduce the value of the first loss function using multiple algorithms including one or more hyper parameters, optimize one or more hyper parameters using multiple optimization algorithms, and perform machine learning by each prescribed learning model 12a. In this case, the computing unit 12 computes the first shape information representing the global shape of the first loss function and the performance of the learning model 12a on the basis of the machine learning for each of the multiple optimization algorithms. Here, the hyper parameters include for example a learning coefficient, when the algorithm is SGD. Similarly, hyper parameters such as a learning coefficient and a momentum coefficient are set for other algorithms. The multiple optimization algorithms may also include random search, Bayesian optimization, CMA-ES, Coordinate Descent, the Nelder-Mead method, particle group optimization, and genetic algorithms. The learning unit 11 predicts the performance of the learning model 12a when machine learning by the learning model 12a is performed using an optimization algorithm which optimizes one or more hyper parameters for multiple algorithms. In this way, which algorithm among the multiple algorithms should be selected can be predicted, and which hyper parameter optimization method should be used can also be predicted, so that the time required for hyper parameter tuning can be reduced.

The storage unit 15 stores learning data 15a including the first shape information and the performance of the learning model 12a. The learning data 15a includes first shape information representing a global shape of a loss function when machine learning by the learning model 12a is performed by a certain algorithm, and the performance of the learning model 12a obtained as a result of the machine learning.

The producing unit 16 produces a predictive model 14a by supervised learning using the learning data 15a. The predictive model 14a may include a neural network and is, for example, a model which predicts the performance of the learning model 12a when machine learning by the learning model 12a is performed so that the second loss function set for the new problem has a reduced value using multiple algorithms and second shape information representing a global shape of the second loss function set for the new problem.

Figure 2:
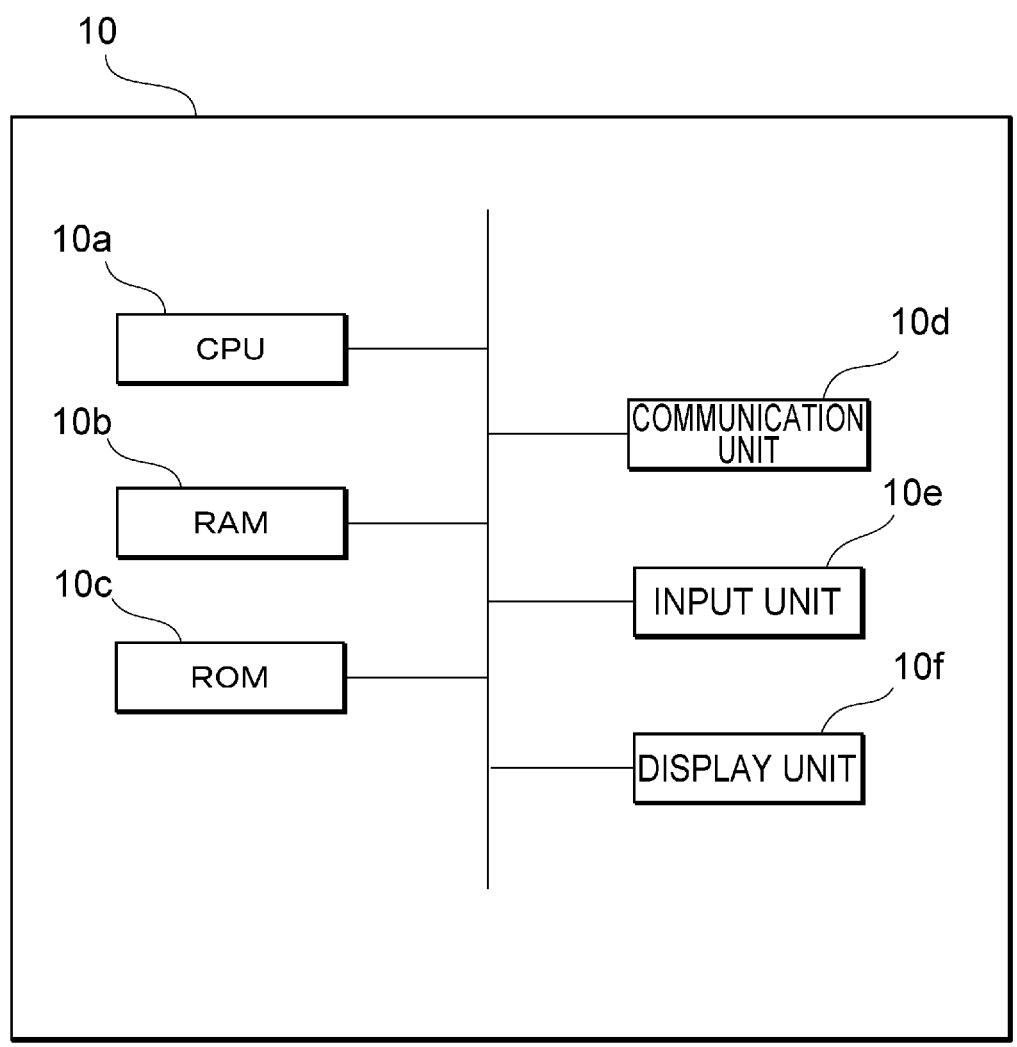
FIG. 2 is a diagram of physical components of the analysis device according to the embodiment.

FIG. 2 is a diagram of exemplary physical components of the analysis device 10 according to the embodiment. The analysis device 10 includes a CPU (Central Processing Unit) 10a corresponding to the computing unit, a RAM (Random Access Memory) 10b corresponding to the storage unit, a ROM (Read Only Memory) 10c corresponding to the storage unit, a communication unit 10d, an input unit 10e, and a display unit 10f. These components are connected with one another through a bus so that data can be transmitted/received among one another. In this example, the analysis device 10 including one computer will be described. However, the analysis device 10 may be implemented as a combination of multiple computers or multiple computing units. The configuration shown in FIG. 2 is an example only, and the analysis device 10 may have other components or may not have some of these components.

The CPU 10a is a control unit which controls execution of programs stored in the RAM 10b or the ROM 10c and computes and processes data. The CPU 10a is a computing unit which executes a program (analysis program) for predicting the performance of the learning model for each of multiple algorithms when machine learning by the learning model is executed using the multiple algorithms so that the second loss function set for the new problem as a reduced value. The CPU 10a receives various kinds of data from the input unit 10e and the communication unit 10d, displays a computing result of the data at the display unit 10f or stores the data in the RAM 10b.

The RAM 10b is the part of the storage unit in which data can be rewritten and may include a semiconductor storage device. The RAM 10b may store data such as programs executed by the CPU 10a, a global shape of a loss function set for a prescribed problem, and learning data including the performance of the learning model. These kinds of data are exemplary, and the RAM 10b may store data other than the above or may not store part of the above data.

The ROM 10c is the part of the storage unit from which data can be read out and may include a semiconductor storage device. The ROM 10c may store analysis programs or data that is not rewritten.

The communication unit 10d is an interface which connects the analysis device 10 to other devices. The communication unit 10d may be connected to a communication network such as the Internet.

The input unit 10e receives data input by a user and may include a keyboard and a touch panel.

A display unit 10f is configured to visually display the arithmetic operation result by the CPU 10a and may include an LCD (Liquid Crystal Display). Displaying the calculation result at the display unit 10f may contribute to XAI (eXplainable AI). The display unit 10f may display a global shape of a loss function.

The analysis program may be stored in a computer-readable storage medium such as the RAM 10b and the ROM 10c and provided or may be provided over a communication network connected by the communication unit 10d. In the analysis device 10, the CPU 10a executes an analysis program, so that various kinds of operation described with reference to FIG. 1 are implemented. These physical components are exemplary and may not necessarily be discrete. For example, the analysis device 10 may include an LSI (Large-Scale Integration) in which the CPU 10a and the RAM 10b or the ROM 10c are integrated. The analysis device 10 may also include a GPU (Graphical Processing Unit) or an ASIC (Application Specific Integrated Circuit).

FIG. 3 is a table for illustrating an example of the performance of a learning model which has gone through learning processing by the analysis device 10 according to the embodiment. The table illustrates the performance of the learning model when one or more hyper parameters are optimized by Random Search, Bayesian Optimization, CMA-ES, Coordinate Descent (Coordinate Search), and the Nelder-Mead method using the algorithms SGD, Momentum SGD, AdaGrad, RMSProp, AdaDelta, ADAM, quantum gate, and quantum annealing. For example, a1 to a5 are numerical values which represent the performance of the learning model when one or more hyper parameters are optimized by Random Search, Bayesian optimization, CMA-ES, Coordinate Descent or the Nelder-Meade method using SGD as an algorithm. Note that b1 to b5, c1 to c5, d1 to d5, e1 to e5, f1 to f5, g1 to g5, and h1 to h5 are numerical values similarly representing the performance of the learning model.

Figure 4:
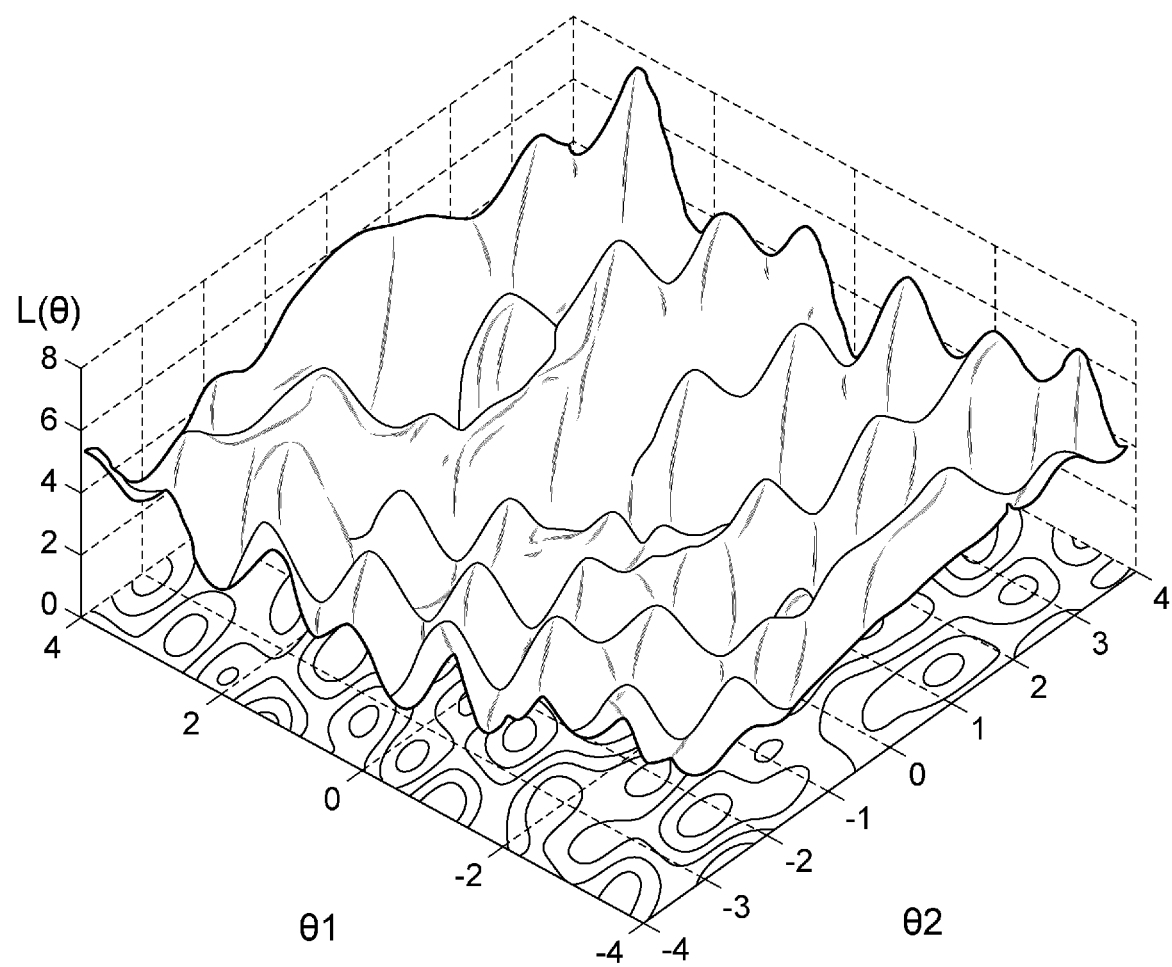
FIG. 4 illustrates shape information computed by the analysis device according to the embodiment.

FIG. 4 shows an example of the shape information produced by the analysis device 10 according to the embodiment. For the sake of simplicity, $\theta 1$ and $\theta 2$ indicate parameters of the learning model, and the value $L(\theta)$ indicates a loss function. As shown, the global shape of the loss function may include multiple minimal points, which may sometimes make it difficult to find the minimum point. The analysis device 10 according to the embodiment regards a global shape of such a loss function as the feature quantity of the learning model and the learning algorithm, and predicts the performance of the learning model from the global shape of the loss function when learning processing by the learning model is performed using the multiple algorithms.

FIG. 5 is a table for illustrating an example of the learning data computed by the analysis device 10 according to the embodiment. The table shows the first shape information and the performance of the learning model for the algorithms SGD, Momentum SGD, AdaGrad, RMSProp, AdaDelta, ADAM, quantum gate and quantum annealing. For example, $La(\theta)$ represents the first shape information when SGD is used as an algorithm, and Sa is a numerical value representing the performance of the learning model when SGD is used as an algorithm. Similarly, $Lb(\theta)$, $Lc(\theta)$, $Ld(\theta)$, $Le(\theta)$, $Lf(\theta)$, $Lg(\theta)$ and $Lh(\theta)$ represent the first shape information when AdaGrad, RMSProp, AdaDelta, ADAM, quantum gate or quantum annealing are used as algorithms. Sb, Sc, Sd, Se, Sf, Sg, and Sh are numerical values which represent the performance of the learning model when the AdaGrad, RMSProp, AdaDelta, ADAM, quantum gate and quantum annealing methods are used as algorithms. The performance of the learning model may be computed for each of hyper parameter optimization algorithms as shown in FIG. 3, and may be used as learning data.

Figure 6:
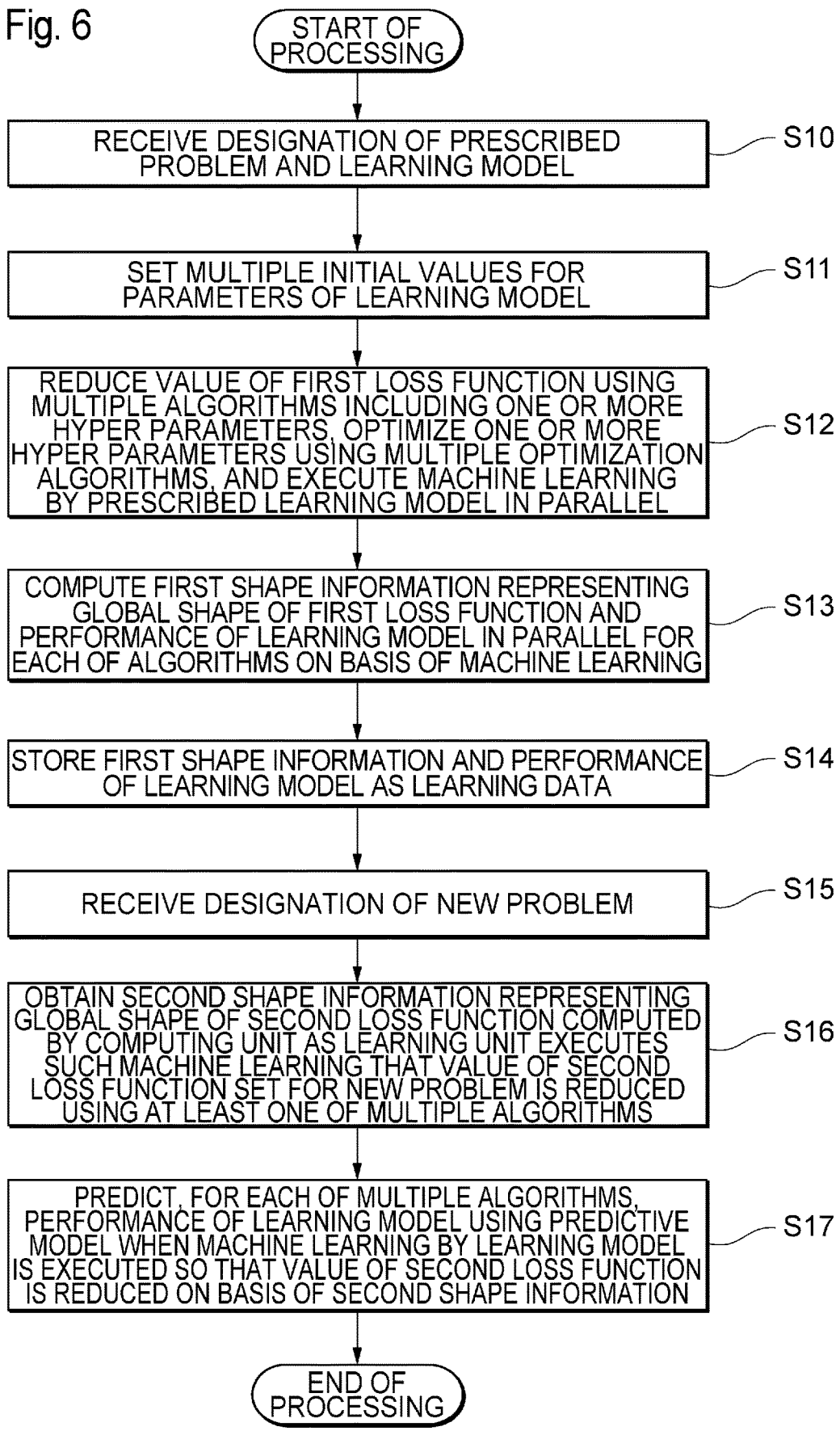
FIG. 6 is a flowchart for illustrating prediction processing executed by the analysis device according to the embodiment.

FIG. 6 is a flowchart for illustrating an example of prediction processing performed by the analysis device 10 according to the embodiment. Initially, the analysis device 10 receives a prescribed problem and designation of a prescribed learning model from another information processing device (S10). The prescribed problem and the designation of the prescribed learning model may be input by the user.

The analysis device 10 then executes machine learning in parallel by the prescribed learning model by setting multiple initial values for the parameters of the learning model (S11), reducing the value of the first loss function using multiple algorithms including one or more hyper parameters, and optimizing one or more hyper parameters using the multiple optimization algorithms, and (S12).

The analysis device 10 computes the first shape information representing the global shape of the first loss function and the performance of the learning model in parallel for each algorithm on the basis of the machine learning (S13). The analysis device 10 stores the first shape information and the performance of the learning model as learning data in the storage unit 15 (S14).

Thereafter, the analysis device 10 receives designation of a new problem from another information processing device (S15). The new problem may be designated in response to an input by the user.

The analysis device 10 obtains second shape information representing a global shape of a second loss function computed by the computing unit 12 as the learning unit 11 executes machine learning using at least one of the multiple algorithms so that the second loss function set for the new problem has a reduced value (S16). Then, the analysis device 10 predicts, for each of the multiple algorithms, the performance of the learning model using a predictive model when machine learning by the learning model is executed so that the second loss function has a reduced value on the basis of the second shape information (S17).

Figure 7:
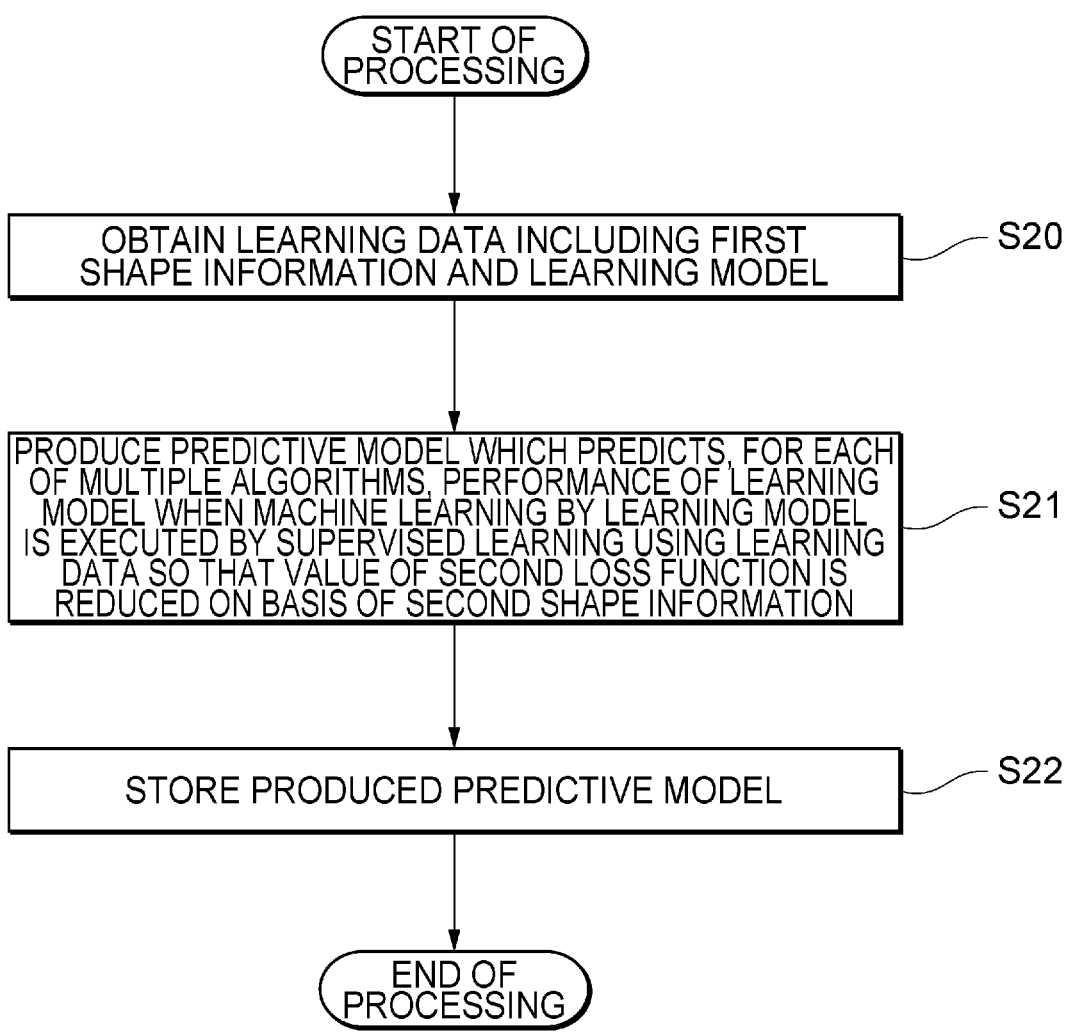
FIG. 7 is a flowchart for illustrating predictive model producing processing executed by the analysis device according to the embodiment.

FIG. 7 is a flowchart for illustrating an example of predictive model producing processing performed by the analysis device 10 according to the embodiment. Initially, the analysis device 10 obtains learning data including the first shape information and the performance of the learning model (S20). The learning data may be obtained from an external storage device over a communication network such as the Internet.

Thereafter, the analysis device 10 produces a predictive model which predicts, for each of the multiple algorithms, the performance of the learning model when machine learning by the learning model is executed so that the second loss function has a reduced value on the basis of the second shape information by supervised learning using the learning data (S21). The analysis device 10 then stores the produced predictive model.

FIG. 8 is a table for illustrating the performance of a learning model which has gone through learning processing by the analysis device 10 according to the embodiment. The table shows the performance of the learning model when the learning data is classified using unsupervised learning such as hierarchical clustering, non-hierarchical clustering, topic model, self-organizing map, association analysis, cooperative filtering, canonical correlation analysis, quantum gate, and quantum annealing, and a pre-processing algorithm according to the classification is applied to optimize one or more hyper parameters by Random Search, Bayesian Optimization, CMA-ES, Coordinate Descent (Coordinate Search), and the Nelder-Mead method. G1 to G5 are numerical values which represent the performance of the learning model when one or more hyper parameters included in hierarchical clustering are optimized by Random Search, Bayesian optimization, CMA-ES, Coordinate Descent or the Nelder-Meade method using the hierarchical clustering as unsupervised learning. Note that G6 to G45 are also numerical values which represent the performance of the learning model.

The learning unit 11 preprocesses learning data used for machine learning using multiple preprocessing algorithms including one or more hyper parameters, reduces the value of the first loss function using multiple algorithms, optimizes one or more hyper parameters using multiple optimization algorithms, and performs machine learning using pre-processed learning data for a prescribed learning model. The computing unit 12 computes the first shape information which represents the global shape of the first loss function and the performance of the learning model for each of multiple preprocessing algorithms on the basis of the machine learning using the pre-processed learning data.

The multiple preprocessing algorithms may include missing value processing, outlier processing, discretization of continuous values, data manipulation, dimensionality reduction, one-hot vectorization, data expansion, feature quantity engineering, and binning. The multiple pre-processing algorithms include algorithms which classify learning data using unsupervised learning and perform pre-processing according to the classification. More specifically, the multiple pre-processing algorithms include algorithms which classify learning data using unsupervised learning such as hierarchical clustering, non-hierarchical clustering, topic model, self-organizing map, association analysis, cooperative filtering, canonical correlation analysis, quantum gate, and quantum annealing, and perform at least one of missing value processing, narrowing down of explanatory variables, one-hot vectorization, and binning according to the classification.

Figure 9:
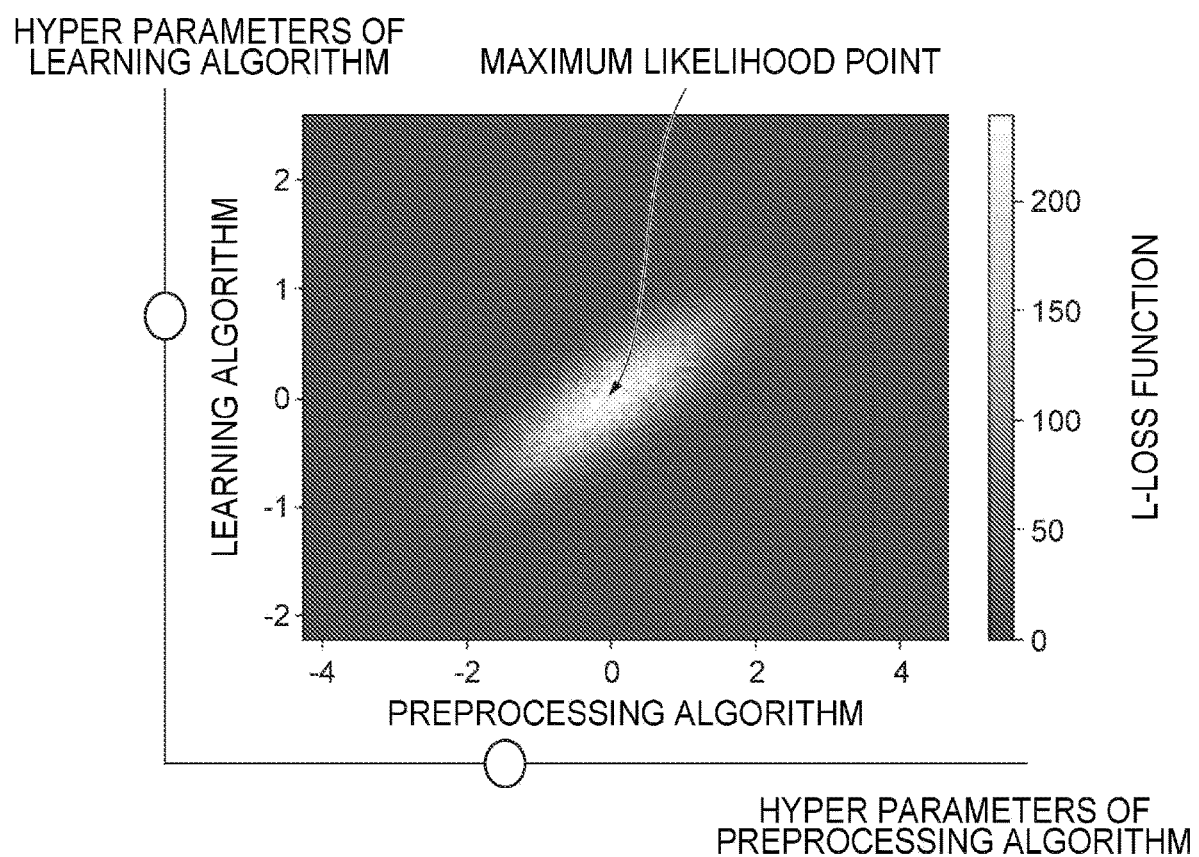
FIG. 9 shows a hyper parameter adjusting screen displayed by the analysis device according to the embodiment.

FIG. 9 shows a hyper parameter adjustment screen displayed by the analysis device 10 according to the embodiment. In the figure, a slide bar for adjusting the hyper parameters of a learning algorithm, a slide bar for adjusting the hyper parameters of a preprocessing algorithm, and the heat map of the value (L-loss function) are shown with the type of learning algorithm represented numerically on the ordinate and the type of preprocessing algorithm represented numerically on the abscissa. Here, L is the maximum value of the loss function. Note that the value of (L-loss function) is an example of a value representing the performance of the learning model, and the analysis device 10 may display a heat map of the value F representing the performance of the learning model or the value F/(computation time of the learning processing) instead of the heat map of the value of the loss function.

The analysis device 10 adjustably displays one or more hyper parameters included in the multiple algorithms and one or more hyper parameters included in the multiple preprocessing algorithms, and displays the performance of the learning model for each of the multiple algorithms and the multiple preprocessing algorithms. The user of the analysis device 10 can efficiently select the optimal algorithms among the multiple learning algorithms and the multiple pre-processing algorithms by determining the point (maximum likelihood point) at which the value of the loss function indicated by the heat map is minimized while adjusting the hyper parameters of the learning algorithm and the hyper parameters of the preprocessing algorithm, and selecting the learning algorithm and the pre-processing algorithm corresponding to the point.

Figure 10:
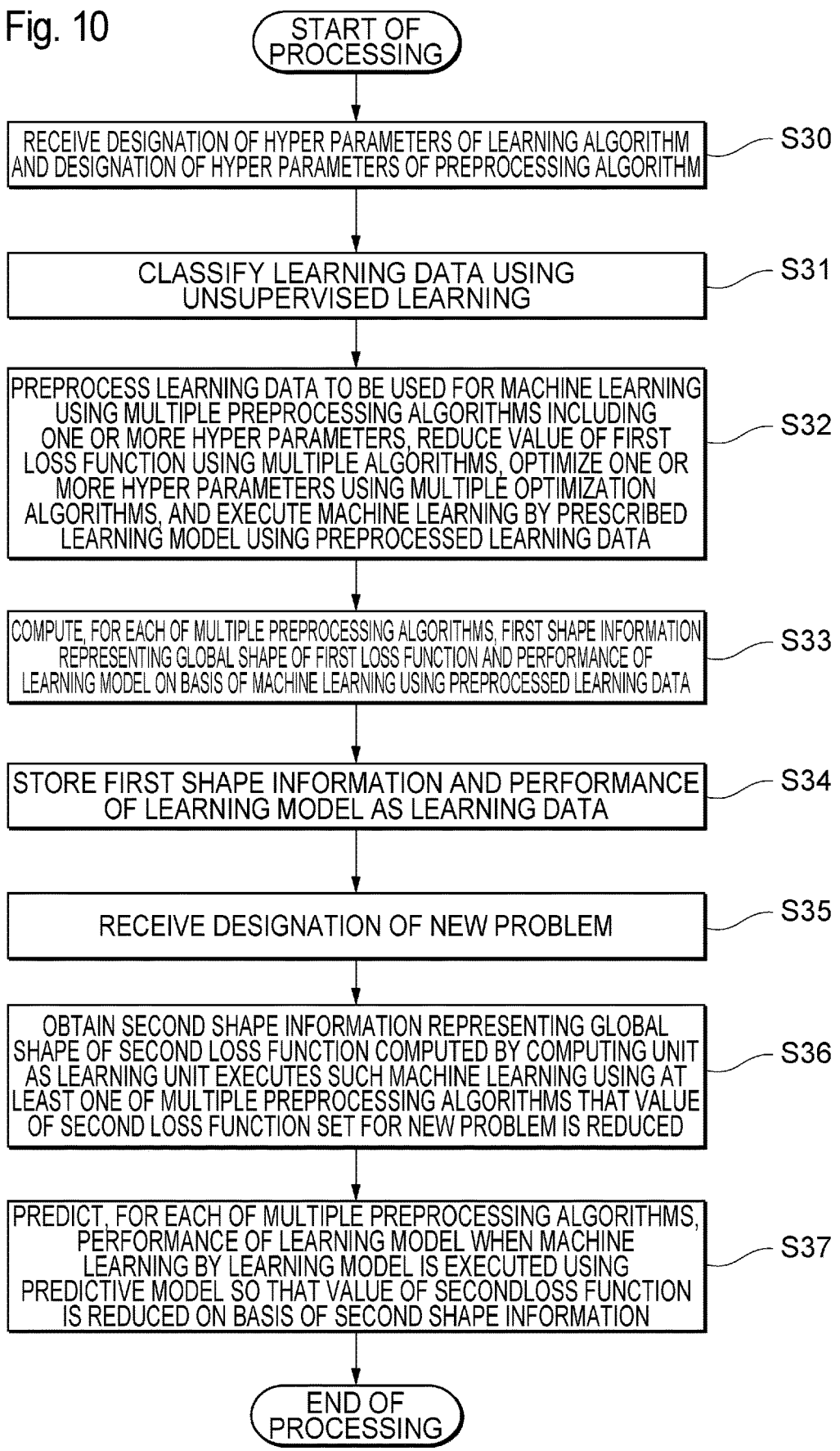
FIG. 10 is a flowchart for illustrating prediction processing executed by the analysis device according to the embodiment.

FIG. 10 is a flowchart for illustrating the prediction processing performed by the analysis device 10 according to the embodiment. Initially, the analysis device 10 receives designation of hyper parameters of a learning algorithm and designation of hyper parameters of a preprocessing algorithm (S30).

Thereafter, the analysis device 10 classifies the learning data using unsupervised learning (S31). The analysis device 10 preprocesses the learning data used for machine learning using multiple preprocessing algorithms including one or more hyper parameters, reduces the value of the first loss function using multiple algorithms, optimizes one or more hyper parameters using multiple optimization algorithms, and executes machine learning using the pre-processed learning data for a prescribed learning model (S32).

The analysis device 10 computes first shape information representing a global shape of a first loss function and the performance of the learning model for each of the multiple preprocessing algorithms on the basis of machine learning using the pre-processed learning data (S33). The analysis device 10 stores the first shape information and the performance of the learning model as learning data (S34).

Thereafter, the analysis device 10 receives designation of a new problem (S35). The analysis device 10 obtains second shape information representing a global shape of a second loss function computed by the computing unit as the learning unit executes such machine learning that the second loss function set for the new problem has a reduced value using at least one of the multiple preprocessing algorithms (S36).

Finally, using the predictive model, the analysis device 10 predicts the performance of the learning model for each of the multiple preprocessing algorithms when machine learning by the learning model is performed so that the second loss function has a reduced valued on the basis of the second shape information (S37).

The embodiments described above are intended to facilitate understanding of the present invention and are not intended to restrictively interpret the present invention. The elements provided according to the embodiment, and the arrangement, materials, conditions, shapes, and sizes thereof are not limited to those illustrated and may be modified as appropriate. The components in the described different embodiments may be partly replaced from one another or combined.

Second Embodiment

Features of a second embodiment of the invention different from the first embodiment will be mainly described, and the contents substantially identical to those of the first embodiment will not be described as appropriate. In the description of the second embodiment, various configurations described in connection with the first embodiment may be applied.

Figure 11:
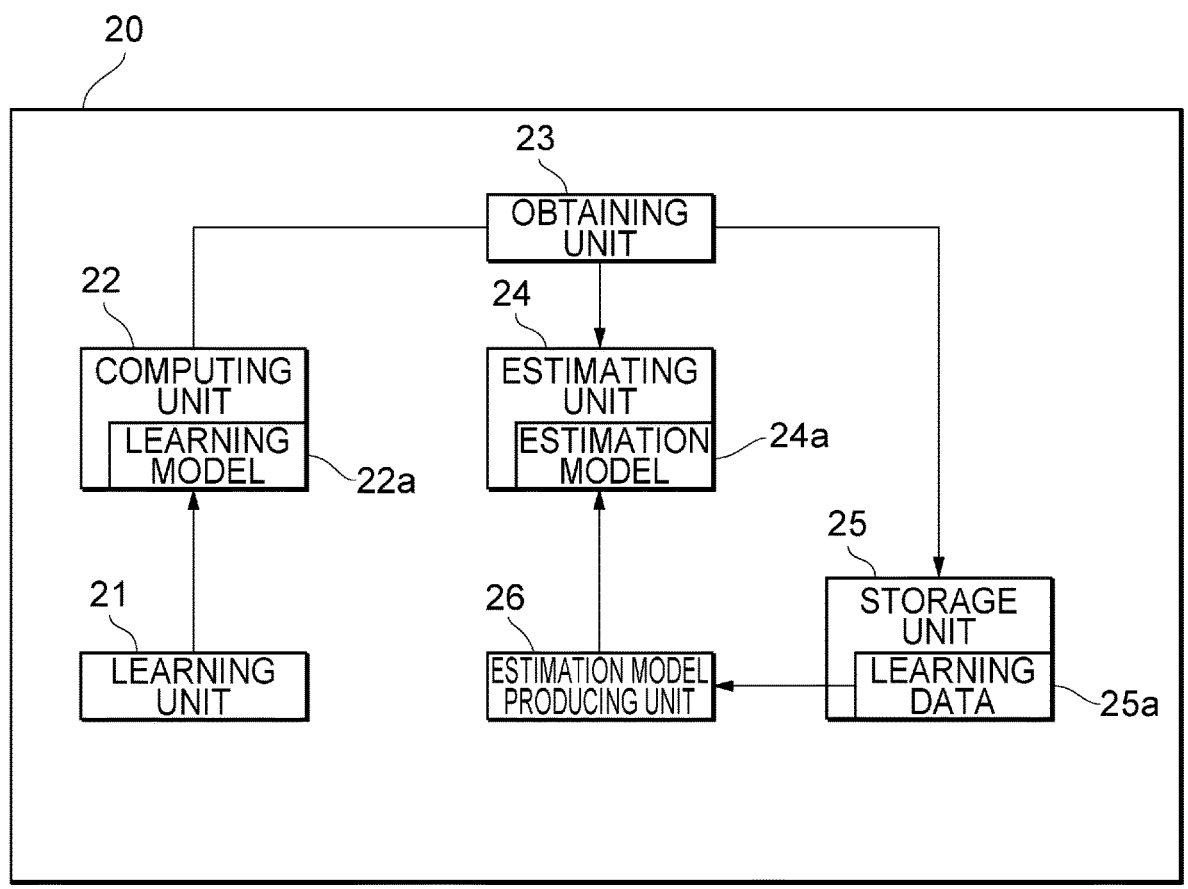
FIG. 11 is a functional block diagram of an analysis device according to a second embodiment of the present invention.

FIG. 11 is a functional block diagram of an analysis device 20 according to the second embodiment. The analysis device 20 according to the second embodiment includes a learning unit 21, a computing unit 22, an obtaining unit 23, an estimating unit 24, a storage unit 25, and an estimation model producing unit 26. The analysis device 20 according to the second embodiment includes the estimating unit 24 instead of the predicting unit 14 of the analysis device 10 according to the first embodiment and includes the estimation model producing unit 26 instead of the producing unit 16 according to the first embodiment. Note that the functions of the learning unit 21, the computing unit 22, the obtaining unit 23, and the storage unit 25 of the analysis device 20 according to the second embodiment may have at least the functions of the corresponding functional units of the analysis device 10 according to at least the first embodiment.

An algorithm according to the second embodiment is for example a reinforcement learning algorithm. The learning unit 21 optimizes one or more hyperparameters included in each of multiple reinforcement learning algorithms using multiple optimization algorithms and performs machine learning by a prescribed learning model using the multiple reinforcement learning algorithms including one or more optimized hyperparameters.

Specifically, the learning unit 21 uses the multiple reinforcement learning algorithms to perform machine learning by a prescribed learning model based on training data set for a prescribed problem. According to the embodiment, the learning unit 21 performs machine learning by the learning model to maximize the reward earned by an agent for example using stock price movement data as the training data. In addition to the price movement data, various kinds of news and social data (such as information on the reputation of stocks) may be used for the machine learning. According to the embodiment, the behavior of the agent in reinforcement learning is, for example, a stock trading transaction (such as buying, selling, and holding of stocks), the reward is a profit from a stock trading transaction, and maximizing the reward corresponds to maximizing the yield. At the time, the learning unit 21 may perform machine learning by the learning model in units of a prescribed period such as 1 μsec.

The computing unit 22 computes the performance of the learning model using test data set for a prescribed problem. According to the embodiment, the test data may include stock price movement data. The performance may be represented as the yield obtained when the learning model is evaluated using the training data.

The storage unit 25 stores data used for machine learning (for example training data and test data such as price movement data), reinforcement learning algorithms, and optimization algorithms. The storage unit 25 also stores learning data 25a including training data and a combination of a reinforcement learning algorithm and an optimization algorithm.

The estimation model producing unit 26 generates an estimation model for estimating a combination of a reinforcement learning algorithm and an optimization algorithm according to a new problem by supervised learning using the training data. Specifically, the estimation model producing unit 26 performs supervised learning using, as learning data, the training data and a combination of an algorithm selected on the basis of the performance of a learning model and an optimization algorithm and thus produces an estimation model for estimating a combination of an algorithm and an optimization algorithm according to a new problem. The combination of the algorithm and optimization algorithm used as the learning data (hereinafter also referred to as the "reinforcement strategy") may be selected on the basis of the performance of the learning model. For example, the optimal reinforcement strategy for a set problem may be selected as the training data by the estimation model producing unit 26.

The estimating unit 24 uses an estimation model 24a to estimate a combination of a reinforcement learning algorithm and an optimal optimization algorithm for a new problem on the basis of data set for the new problem. Here, the data set for the new problem may be new stock price movement data that is not used for machine learning.

The analysis device 20 according to the second embodiment has a physical configuration substantially identical to the physical configuration of the analysis device 10 according to the first embodiment shown in FIG. 2. Here, different features between the physical configuration of the analysis device 20 according to the second embodiment and the physical configuration of the analysis device 10 according to the first embodiment will be briefly described.

A CPU 10a according to the second embodiment is an arithmetic unit which executes a program (an analysis program) for optimizing one or more hyperparameters included in each of multiple algorithms using multiple optimization algorithms, performing machine learning by a prescribed learning model using the multiple algorithms, and computing the performance of the learning model for each of the algorithms and the optimization algorithms.

A RAM 10b according to the second embodiment may store data such as programs to be executed by the CPU 10a, training data, test data, combinations of reinforcement learning algorithms, and optimization algorithms. These are only examples, and the RAM 10b may store data other than the above, or some of the above may not be stored. A display unit 10f according to the second embodiment may display an estimation result by the estimation model.

FIG. 12 is a diagram showing price movement data about a prescribed stock for use in machine learning by a learning model according to the embodiment. The price movement data is for example data about a stock price which fluctuate on a daily basis, and data covers from January to December in 2019. According to the embodiment, for example, the holdout method is used, and the price movement data is divided into training data and test data. For example, the price movement data from the beginning of January to the end of June in 2019 may be used as the training data, and the price movement data from the beginning of July to the end of December in 2019 may be used as the test data.

FIG. 13 shows reinforcement learning algorithms and optimization algorithms used in machine learning by the analysis device 20 according to the embodiment. As shown, according to the embodiment, reinforcement learning algorithms are used, examples of such algorithms include a Turtle Trading agent, a Moving Average agent, a Signal Rolling agent, a Policy Gradient agent, a Q-learning agent, an Evolution Strategy agent, a Double Q-learning agent, a Recurrent Q-learning agent, a Double Recurrent Q-learning agent, a Duel Q-learning agent, a Double Duel Q-learning agent, a Duel Recurrent Q-learning agent, a Double Duel Recurrent Q-learning agent, an Actor-critic agent, an Actor-critic Duel agent, an Actor-critic Recurrent agent, an Actor-critic Duel Recurrent agent, a Curiosity Q-learning agent, a Recurrent Curiosity Q-learning agent, a Duel Curiosity Q-learning agent, a Neuro-evolution agent, Neuro-evolution with a Novelty search agent, an ABCD strategy agent, and Deep Evolution Strategy. For each of the reinforcement learning algorithms, one or more hyperparameters are optimized according to optimization algorithms including Random Search, Bayesian Optimization, CMA-ES, Coordinate Descent (Coordinate Search) and Nelder-Mead according to the embodiment.

In FIG. 13, G1 to G120 are numbers which identify combinations of reinforcement learning algorithms and optimization algorithms. According to the embodiment, the performance is computed by the computing unit 22 for each of learning models built by the reinforcement strategies designated by G1 to G120. The performance computation may be based on evaluation using test data (for example using obtained yields). In this way, an optimal reinforcement strategy or reinforcement strategy which allows the most highly evaluated learning model to be built can be obtained.

In the example according to the embodiment, the analysis device 20 may specify the optimal reinforcement strategy for each of multiple pieces of price movement data about different stocks and store the price movement data and the information about the optimal reinforcement strategy in association with each of multiple identification numbers. The data pieces associated with the multiple identification numbers may include the price movement data, the stock name (for example, A Corporation), the period of the price movement data (for example from January 1 to April 30), the period of the training data (for example from January 1 to February 28), the optimal reinforcement strategy (for example G1), the test data period (for example from March 1 to April 30), and the yield (for example 12%). The yield may be the IRR (internal rate of return), which is a yield obtained when the optimal reinforcement strategy is evaluated using the test data. Here, the training data and the optimal reinforcement strategy extracted on the basis of the information associated with each of the multiple identification numbers become learning data for producing an estimation model which will be described in the following.

FIG. 14 shows an exemplary estimation model produced by the estimation model producing unit 26. As shown in FIG. 14, the estimation model includes a neural network including an input layer 31, a hidden layer 32, and an output layer 33. The estimation model producing unit 26 performs supervised learning using the training data and the optimal reinforcement strategy as the training data and produces an estimation model. Specifically, the estimation model producing unit 26 inputs the training data to the input layer 31 and learns weighting parameters so that an optimal reinforcement strategy is output from the output layer 33. At the time, in addition to the training data, the estimation model producing unit 26 may input various kinds of data regarding the price movement data (for example the name of the stock) to the input layer 31 as associated information.

When the price movement data (and the associated information) set for a new problem is input to the input layer 31 of the produced estimation model, the output layer 33 outputs the reinforcement strategy corresponding to the new problem. For example, the reinforcement strategy designated by G11 shown in FIG. 13 can be output as the optimal reinforcement strategy for the new problem. Here, the analysis device 20 may display 120 combinations shown in FIG. 12 in an order (for example in order of yields) according to their performances (for example the yields) on the display unit of the analysis device 20 using the softmax function. In this way, an appropriate reinforcement strategy for example according to a stock can be selected and a learning model with a good yield can be built.

Figure 15:
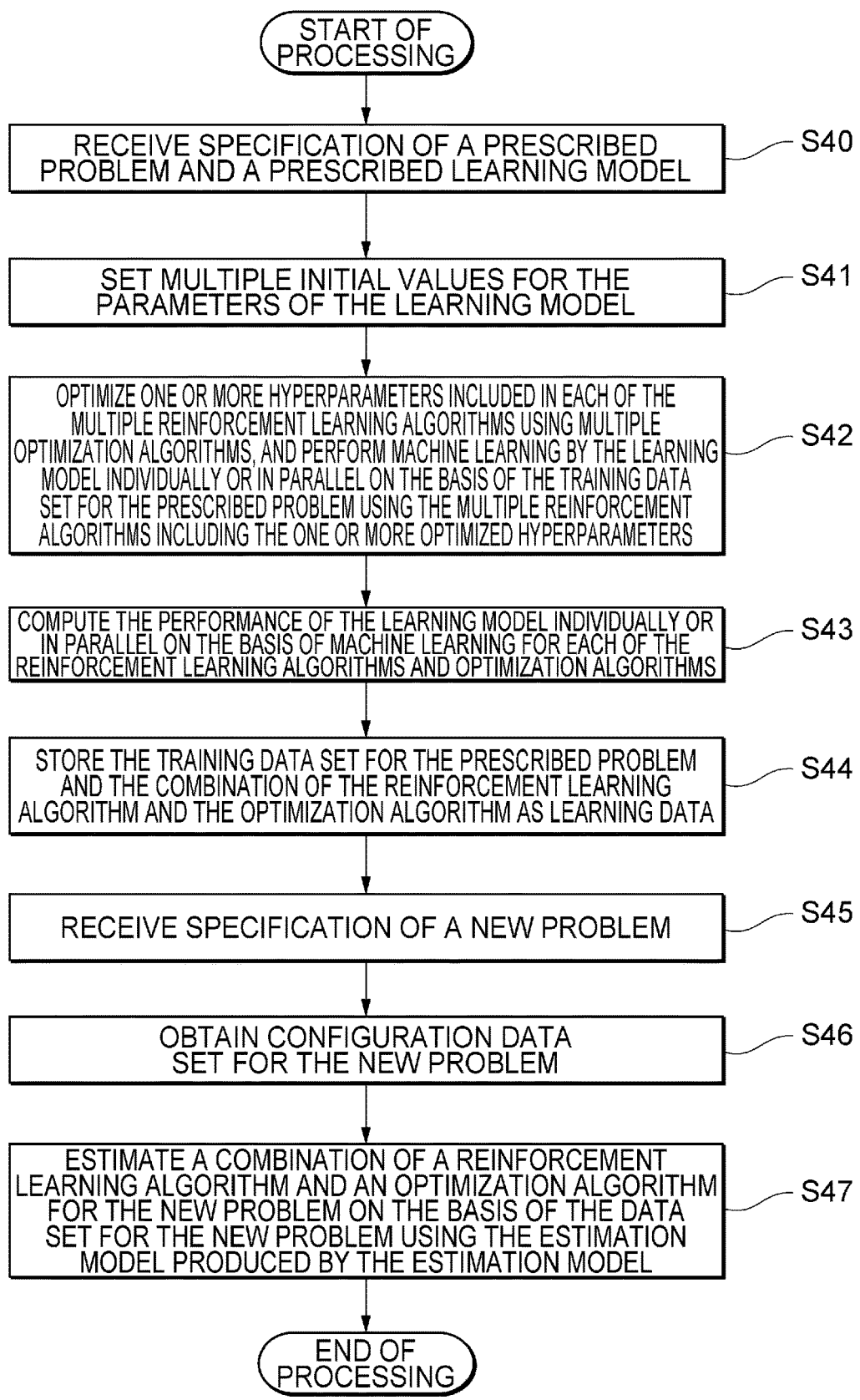
FIG. 15 is a flowchart for illustrating exemplary estimation processing carried out by the analysis device according to the embodiment.

FIG. 15 is a flowchart for illustrating exemplary estimating processing performed by the analysis device 20 according to the embodiment. The analysis device 20 first receives specification of a prescribed problem and a prescribed learning model from another information processing device (S40). The specification of a prescribed problem and the prescribed learning model may be input by the user.

Then, the analysis device 20 sets multiple initial values for the parameters of the learning model (S41). Then, the analysis device 20 optimizes one or more hyperparameters included in each of the multiple reinforcement learning algorithms using multiple optimization algorithms, and performs machine learning by the learning model individually or in parallel on the basis of the training data set for the prescribed problem using the multiple reinforcement algorithms including the one or more optimized hyperparameters (S42).

The analysis device 20 also computes the performance of the learning model individually or in parallel on the basis of machine learning for each of the reinforcement learning algorithms and optimization algorithms (S43). Then, the analysis device 20 stores the training data set for the prescribed problem and the combination of the reinforcement learning algorithm and the optimization algorithm in the storage unit 25 as learning data (S44).

Thereafter, the analysis device 20 receives specification of a new problem from another information processing device (S45). The specification of a new problem may be input by the user. Then, the analysis device 20 obtains configuration data set for the new problem (S46).

Then, the analysis device 20 estimates a combination of a reinforcement learning algorithm and an optimization algorithm for the new problem on the basis of the data set for the new problem using the estimation model produced by the estimation model producing processing described as follows (S47).

Figure 16:
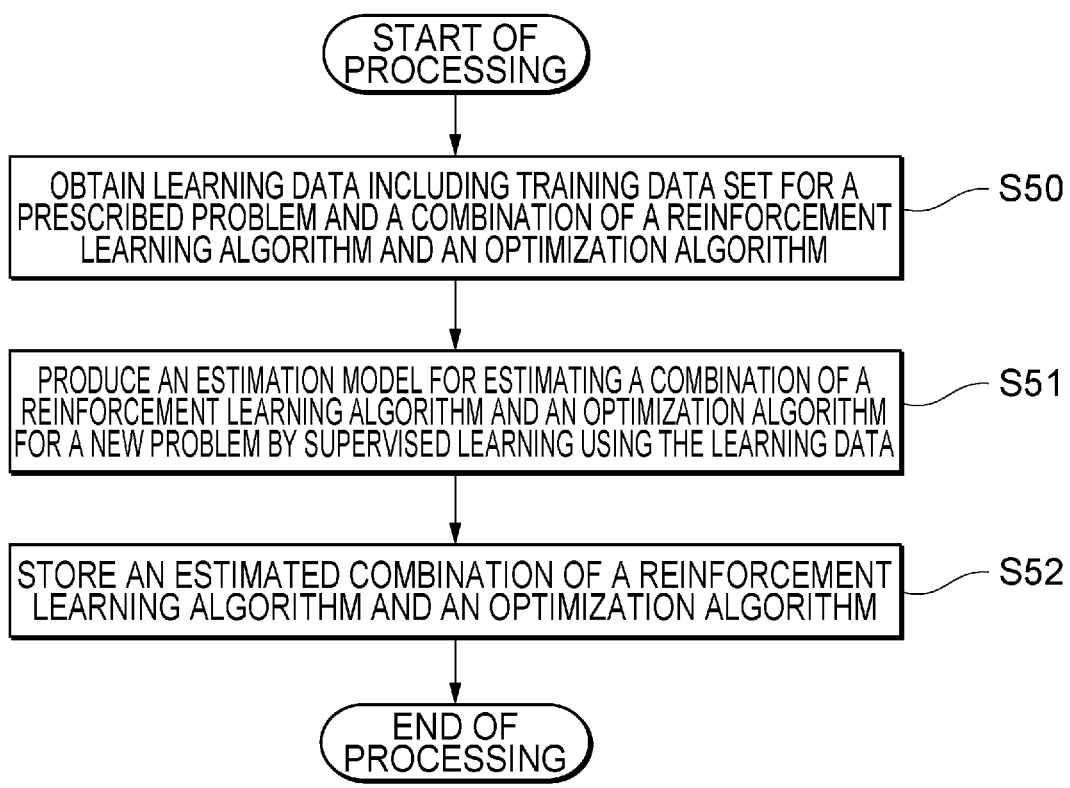
FIG. 16 is a flowchart for illustrating exemplary estimation model producing processing carried out by the analysis device according to the embodiment.

FIG. 16 is a flowchart for illustrating exemplary estimation model producing processing performed by the analysis device 20. The analysis device 20 first obtains learning data including training data set for a prescribed problem and a combination of a reinforcement learning algorithm and an optimization algorithm (S50). The learning data may be obtained from an external storage device through a communication network such as the Internet.

Thereafter, the analysis device 20 produces an estimation model for estimating a combination of a reinforcement learning algorithm and an optimization algorithm for a new problem by supervised learning using the learning data (S51). Then, the analysis device 20 stores the generated estimation model (S52).

Various algorithms for building learning models and various optimization algorithms for optimizing the hyperparameters included in the algorithms have been proposed. However, there are many combinations of algorithms and optimization algorithms, and it has been difficult to select an appropriate combination. According to the embodiment, the performance of a learning model built by machine learning is evaluated for each of algorithms and optimization algorithms. Therefore, a more appropriate combination of an algorithm and an optimization algorithm may be easily selected.

In the above description of the embodiment, the algorithm is a reinforcement learning algorithm, but the algorithm is not limited to the above and may be an algorithm used in various types of machine learning such as supervised learning and unsupervised learning. In other words, according to the disclosure, the performance of the learning model can be computed for each of the various algorithms and optimization algorithms.

According to the second embodiment, various configurations described in connection with the first embodiment may be applied. For example, the preprocessing described in connection with the first embodiment may be applied. As a result, various kinds of processing such as preprocessing, reinforcement learning, and optimization of hyperparameters are automatically performed, and stock trading transactions can be executed using the algorithms according to the disclosure.

APPLICATION EXAMPLES

The following first to third application examples will be described as application examples of the embodiments. In the following description of the application examples, it is assumed that the analysis device 20 according to the second embodiment is mainly used.

First Application Example

In the above description of the second embodiment, an agent in reinforcement learning performs stock trading transactions by way of example. The reinforcement learning is not limited to the above, and the features of the disclosure may be applied to various kinds of reinforcement learning. For example, the agent in reinforcement learning may be a self-driving car which travels by automatic operation. In this case, for example, a score of (MAD+FDE)/2 may be used as an indicator, and as the score is reduced, the agent can get more reward. In this case, the algorithm may include Social LSTM, Social GAN, MX-LSTM, Social Force, SR-LSTM, RED, and Ind-TF, and AMENet. These algorithms are described in the following documents.

(Social LSTM): A. Alahi, K. Goel, V. Ramanathan, A. Robicquet, L. Fei-Fei, S. Savarese, Social lstm: Human trajectory prediction in crowded spaces, in: In Proceedings of CVPR, 2016, pp. 961-971.
(Social GAN): A. Gupta, J. Johnson, L. Fei-Fei, S. Savarese, A. Alahi, Social gan: Socially acceptable trajectories with generative adversarial networks, in: In Proceedings of CVPR, 2018, pp. 2255-2264.
(MX-LSTM): I. Hasan, F. Setti, T. Tsesmelis, A. Del Bue, F. Galasso, M. Cristani, Mxlstm: mixing tracklets and vislets to jointly forecast trajectories and head poses, in: In Proceedings of CVPR, 2018, pp. 6067-6076.
(Social Force): D. Helbing, P. Molnar, Social force model for pedestrian dynamics, Physical review E 51 (5) (1995) 4282.
(SR-LSTM): P. Zhang, W. Ouyang, P. Zhang, J. Xue, N. Zheng, Sr-lstm: State refinement for lstm towards pedestrian trajectory prediction, in: In Proceedings of CVPR, 2019, pp. 12085-12094.
(RED): S. Becker, R. Hug, W. H"ubner, M. Arens, An evaluation of trajectory prediction approaches and notes on the trajnet benchmark, arXiv preprint arXiv: 1805.07663 (2018).
(Ind-TF): F. Giuliari, I. Hasan, M. Cristani, F. Galasso, Transformer networks for trajectory forecasting, arXiv preprint arXiv:2003.08111 (2020).
(AMENet): AMENet: Attentive Maps Encoder Network for Trajectory Prediction, Hao Chenga, Wentong Liaob, Michael Ying Yangc, Bodo Rosenhahnb, Monika Sester.

Examples of the optimization algorithms also include random search, Bayesian optimization, CMA-ES, the Coordinate Descent, and the Nelder-Mead method. The indicator of reinforcement learning is not limited to (MAD+FDE)/2 and may be MAD or FDE. For combinations of these algorithms and optimization algorithms, the performance of the learning model may be calculated, for example, by the computing unit 22. The agent can determine which combination of an algorithm and an optimization algorithm is optimal on the basis of the performance of the learning model produced for example by LSTM.

Second Application Example

Techniques for wireless communication networks with millimeter or sub-terahertz waves have been developed. In order to maximize the performance of the wireless communication network with millimeter or sub-terahertz waves, it has become an issue to realize low delay and high reliability which have never been achieved. The wireless network may obtain a sense of surroundings by machine learning in order to effectively solve the problem.

The following reference document 2 describes attempts to solve the above problem by using deep learning and computer vision. Specifically, reference document 2 describes a deep neural network architecture that learns how to predict future link-brockages from observed RGB image sequences and beam forming vectors.

However, the hyperparameter optimization algorithm according to reference document 2 is ADAM and its batch size is 1000. In this condition, the prediction accuracy about link brockage is about 86%. For the technique according to reference document 2, it can be considered that the prediction accuracy can be improved by automatically optimizing hyperparameters or selecting a combination of an algorithm which allows an optimal learning model to be built and an optimization algorithm as disclosed herein.

(Reference document 2): G. Charan, M. Alrabeiah, and A. Alkhateeb, Vision-Aided Dynamic Blockage Prediction for 6G Wireless Communication Networks, arXiv preprint arXiv:2006.09902 (2020).

Third Application Example

The following reference document 3 describes a technique for estimating a person visible over a curve mirror from an autonomous moving robot. Reference document 3 uses a network based on FCN-8s at-once. The network includes two networks, one of which is a classification network which performs semantic segmentation and the other is a regression network which performs depth image prediction. The classification network and the regression network both initialize the weight using a pretrained VGG16 model up to its fc7 layer. In particular, layers up to the pool 5 layer are treated as feature quantity extractors. However, since the input to the regression network is a six-channel image produced by connecting a three-channel color image Ireal and a three-channel depth image Dcolor obtained by converting a depth image Dreal obtained from a sensor, the weight of only the convl_1 layer is duplicated to correspond to the six channels.

(Reference document 3): Yuto Uchimi, Shingo Kitagawa, tori Yanokura, Kei Okada, and Masayuki Inaba: Object Perception in the Blind Spots with Mirror Based on Depth Prediction Using CNN, Proceedings of the Annual Conference of the Japanese Society for Artificial Intelligence, 33rd Annual Conference, 2019.

However, in reference document 3, hyperparameter optimization and learning model selection are not automated, and therefore the estimation accuracy is considered insufficient. In addition, processing should be carried out faster so that a robot detects a target such as a person (or a bicycle or a vehicle) at any time. Since adjustment about hyperparameter optimization and appropriate learning model selection are automated according to the technique of the present disclosure, the accuracy and speed of estimation can be improved.

Fourth Application Example

In the following description of a fourth application example, the analysis device executes, in parallel, processing for inferring an appropriate combination of algorithms (hereinafter also referred to as "inference processing") and processing for searching for all combinations of algorithms (hereinafter also referred to as "full search processing").

In the fourth application example, a learning model may be produced by pre-processing of learning data using the preprocessing algorithm, optimization of hyperparameters using the optimization algorithm, and machine learning using the reinforcement learning algorithm. In the fourth application example, a combination of a preprocessing algorithm, an optimization algorithm, and a reinforcement learning algorithm is also simply referred to as a combination of algorithms. The analysis device may also calculate performance for each of the combinations of algorithms using, for example, training data, as described in connection with the second embodiment. Furthermore, the analysis device may apply various methods described in connection with the second embodiment to the combination of algorithms and produce an estimation model for estimating a combination of algorithms corresponding to a new problem. At the time, the estimation model may be produced using the training data, the combination of algorithms, and the performance as learning data.

In the fourth application example, the analysis device may obtain data from an external device connected to a network, add or update learning data (for example stock price movement data) in units of a first period, and take action (for example a stock trading transaction) by a prescribed learning model. At the time, the analysis device can execute the inference processing in units of a second period and further execute the full search processing in units of a third period. Here, the first period may be shorter than the second period, and the second period may be shorter than the third period. The first, second, and third periods are not particularly limited, but in the description of the fourth application example, these periods are 1 μsec, 1 minute, and 1 hour, respectively.

In the full-search processing, a learning model is produced by machine learning using each of the combinations of algorithms on the basis of the obtained learning data, and the performance of each of the algorithm combinations is evaluated, so that the performance data associated with each of the algorithm combinations is updated. Here, it takes the third period to evaluate the performance of all algorithm combinations using data obtained during the second time period. Therefore, the performance data is updated once every hour using six million data pieces. By reference to the updated performance data, the most appropriate combination of algorithms can be specified, and at least some of the performance data pieces becomes learning data to be used for producing an estimation model.

The inference processing may include inputting stock price movement data to an estimation model, obtaining a combination of algorithms corresponding to the input data, and switching to a learning model produced on the basis of an algorithm that obtains a learning model for trading stocks. For example, the analysis device may input six million data pieces into an estimation model to obtain a combination of algorithms and switch to a learning model produced by the obtained combination of algorithms. The analysis device can take action in units of the first period using the learning model.

The analysis device is strong in executing transactions since the device conducts a stock trading transaction every short period of time or in units of the first period. Specifically, the device is strong against a sudden upward trend or downward trend in stock prices, a great depression, and a bubble. When all the algorithm combinations are not searched for, and trading is based on an appropriate learning model, the risk of opportunity losses or simple losses is always present.

When there is one algorithm combination, stock trading transactions by the analysis device may be predicted by others, and the analysis device may be subjected to an attack which causes the analysis device to take contrarian approach. For example, when the analysis device is predicted to invest 1 billion yen in stock A, an attach such as short selling of 100 billion yen may be initiated. In order to protect against such an attack, the analysis device may conduct short selling in the next few μsec, or the analysis device may be controlled so as not to make a choice that may incur a large loss at a time.

The analysis device is strong in response to an instruction about a transaction method, and more specifically, the analysis device can switch to a more appropriate combination of algorithms in units of the second period using newly obtained learning data (for example stock price movement data obtained one hour earlier). More specifically, the stock can be traded while the algorithm combination for stock trading is changed inside the analysis device from time to time. This reduces the risk of opportunity losses and simple losses. Since more diverse algorithm combinations can be used, the possibility of losses due to contrarian attacks described above can be reduced.

The analysis device can update the performance data about the algorithm combinations every third period, is strong in measuring transactions, and in particular, can find an optimal solution to stock price movement with very high accuracy. Due to the nature of the processing, data processing takes long, but very good learning data for an estimation model can be produced.

The analysis device according to the fourth application example will be able to perform more appropriate processing while repeating the trading, inference, and full-search processing using the learning model.

In the description of the fourth application example, the analysis device carries out stock trading transactions, while the processing for executing the inference processing and the full search processing in parallel can be used for various purposes such as vehicle automatic driving.

Fifth Application Example

According to the above-described embodiments, an exemplary analysis device mainly optimizes learning data using a pre-processing algorithm, optimizes hyperparameters using an optimization algorithm, and performs machine learning using an algorithm is described. In a fifth application example, the analysis device performs preprocessing to learning date before preprocessing by the preprocessing algorithm, in other words, preprocessing for the preprocessing is performed.

The algorithm for the preprocessing for the preprocessing may be any of the algorithms described in reference document 4, the first document to mention the CASH problem, reference document 5 relating to AutoML (Automated Machine Learning) written in Python, reference document 6 which introduces meta-learning, and reference document 7 which describes producing flexible pipelines with genetic algorithms.

(Reference document 4): C. Thornton, F. Flutter, H. H. Hoos, and K. L. Brown, Auto-WEKA: Combined Selection and Hyperparameter Optimization of Classification Algorithms, arXiv preprint arXiv: 1208.3719, 2013.

(Reference document 5): B. Komer, J. Bergstra and C. Eliasmith, Hyperopt-Sklearn: Automatic Hyperparameter Configuration for Scikit-Learn, In Proc. of THE 13th PYTHON IN SCIENCE CONF.: pages 34-40, 2014.

(Reference document 6): M. Feurer, A. Klein, K. Eggensperger, J. Springenberg, M. Blum and F. Hutter, Efficient and Robust Automated Machine Learning, NIPS, 2015.
(Reference document 7): R. S. Olson, N. Bartley, R. J. Urbanowicz and J. H. Moore, Evaluation of a Tree-based Pipeline Optimization Tool for Automating Data Science, arXiv preprint arXiv: 1603.06212, 2016.

The analysis device may produce a learning model using a combination of a preprocessing algorithm, an optimization algorithm, and an algorithm on the basis of the algorithms for preprocessing for preprocessing described in these reference documents (specifically, the algorithms before the preprocessing algorithm, the optimization algorithm, and the algorithm are executed). The analysis device may also compute the performance of each of combinations of the algorithms.

It can be expected that an AGI (Artificial General Intelligence), a more versatile AI, can be produced by carrying out preprocessing to learning data having been subjected to preprocessing for the preprocessing, optimizing hyperparameters, and producing a learning model using algorithms. More specifically, an AI can be realized using all kinds of learning data such as electroencephalography data and image data.

REFERENCE SIGNS LIST 10, 20 Analysis device
10a CPU
10b RAM
10c ROM
10d Communication unit
10e Input unit
10f Display unit
11, 21 Learning unit
12, 22 Computing unit
12a, 22a Learning model
13, 23 Obtaining unit
14 Predicting unit
14a Prediction model
24 Estimating unit
24a Estimation model
15, 25 Storage unit
15a, 25a Learning data
16 Producing unit
26 Estimation model producing unit

What is claimed is:

1. An analysis device including at least one processor, the at least one processor executes instructions stored in a non-transitory computer-readable medium, the instructions comprising:

performing machine learning by a prescribed learning model using multiple algorithms so that a first loss function set for a prescribed problem has a reduced value, the prescribed learning model including a plurality of parameters and utilizing a neural network, the first loss function being a function related to the plurality of parameters;

for each one of the multiple algorithms, computing first shape information representing a global shape of the first loss function and a performance of the prescribed learning model by performing the machine learning using the each one of the multiple algorithms, the first shape information being a shape represented by recording values of the first loss function for values of each parameter of the plurality of parameters;

training the neural network using at least one of the multiple algorithms so that a second loss function set for a new problem has a reduced value;

computing second shape information representing a global shape of the second loss function by performing the machine learning for the new problem, the second shape information being a shape represented by recording values of the second loss function for values of each parameter of the plurality of parameters included in the prescribed learning model for the new problem; and predicting, for each of the multiple algorithms, a performance of the prescribed learning model when machine learning by the prescribed learning model is performed using a predictive model produced by supervised learning using the first shape information and the performance of the prescribed learning model for the each of the multiple algorithms as learning data so that the second loss function has a reduced value on the basis of the second shape information.

2. The analysis device according to claim 1, wherein the performing the machine learning by the prescribed learning model by reducing the value of the first loss function using the multiple algorithms including one or more hyper parameters and adjusting the one or more hyper parameters using multiple evaluation algorithms to reduce the value of the first loss function, and computing, for each of the evaluation algorithms, the first shape information representing the global shape of the first loss function and the performance of the learning model on the basis of the machine learning.

3. The analysis device according to claim 1, further comprises producing the predictive model by supervised learning using the learning data.

4. The analysis device according to claim 1, further comprises setting multiple initial values for a parameter of the learning model and performing machine learning in parallel by the prescribed learning model using the multiple algorithms so that the first loss function has a reduced value, and computing in parallel, for each of the algorithms, the first shape information and the performance of the learning model on the basis of the machine learning.

5. The analysis device according to claim 1, wherein the learning model comprises a model using a neural network.

6. The analysis device according to claim 5, wherein the multiple algorithms include an algorithm which updates a parameter of the neural network by error back propagation.

7. The analysis device according to claim 1, wherein the prescribed problem and the new problem include a problem which at least classifies, produces, or reduces error in evaluating at least one of image data, series data, and text data.

8. The analysis device according to claim 1, wherein the multiple algorithms include an algorithm which updates a parameter of the learning model by a quantum gate type or quantum annealing type quantum computer.

9. The analysis device according to claim 1, further comprises processing learning data to be used for the machine learning using multiple preprocessing algorithms including one or more hyper parameters, reduces the value of the first loss function using the multiple algorithms, adjusts the one or more hyper parameters using multiple evaluation algorithms to reduce the value of the first loss function, and performs machine learning by the prescribed learning model using the preprocessed learning data, and computing, for each of the multiple preprocessing algorithms, the first shape information representing the global shape of the first loss function and the performance of the learning model on the basis of machine learning using the preprocessed learning data.

10. The analysis device according to claim 9, wherein the multiple preprocessing algorithms include an algorithm which classifies the learning data using unsupervised learning and preprocesses the learning data according to the classification.

11. The analysis device according to claim 9, wherein one or more hypermeters included in the multiple algorithms and one or more hyper parameters included in the multiple preprocessing algorithms are adjustably displayed, and the performance of the learning model is displayed for each of the multiple algorithms and the multiple preprocessing algorithms.

12. An analysis method for performing machine learning performance prediction, the method comprising:
   performing machine learning by a prescribed learning model using multiple algorithms so that a first loss function set for a prescribed problem has a reduced value, the prescribed learning model including a plurality of parameters and utilizing a neural network, the first loss function being a function related to the plurality of parameters;
   for each one of the multiple algorithms, computing first shape information representing a global shape of the first loss function and a performance of the prescribed learning model by performing the machine learning using the each one of the multiple algorithms, the first shape information being a shape represented by recording values of the first loss function for values of each parameter of the plurality of parameters;
   training the neural network using at least one of the multiple algorithms so that a second loss function set for a new problem has a reduced value;
   computing second shape information representing a global shape of the second loss function by performing the machine learning for the new problem, the second shape information being a shape represented by recording values of the second loss function for values of each parameter of the plurality of parameters included in the prescribed learning model for the new problem; and
   predicting, for each of the multiple algorithms, a performance of the prescribed learning model when machine learning by the prescribed learning model is executed using a predictive model produced by supervised learning using the first shape information and the performance of the prescribed learning model for the each of the multiple algorithms as learning data so that the second loss function has a reduced value on the basis of the second shape information.

13. A non-transitory computer readable medium, storing instructions for performing machine learning performance prediction, the instructions comprising:
   performing machine learning by a prescribed learning model using multiple algorithms so that a first loss function set for a prescribed problem has a reduced value, the prescribed learning model including a plurality of parameters and utilizing a neural network, the first loss function being a function related to the plurality of parameters;
   for each one of the multiple algorithms, computing first shape information representing a global shape of the first loss function and a performance of the prescribed learning model by performing the machine learning using the each one of the multiple algorithms, the first shape information being a shape represented by recording values of the first loss function for values of each parameter of the plurality of parameters;
   training the neural network using at least one of the multiple algorithms so that a second loss function set for a new problem has a reduced value;
   computing second shape information representing a global shape of the second loss function by performing the machine learning for the new problem, the second shape information being a shape represented by recording values of the second loss function for values of each parameter of the plurality of parameters included in the prescribed learning model for the new problem; and
   predicting, for each of the multiple algorithms, a performance of the prescribed learning model when machine learning by the prescribed learning model is executed using a predictive model produced by supervised learning using the first shape information and the performance of the prescribed learning model for the each of the multiple algorithms as learning data so that the second loss function has a reduced value on the basis of the second shape information.

\* \* \* \* \*